United States Patent [19]

Dodds et al.

[11] Patent Number: 4,972,365
[45] Date of Patent: Nov. 20, 1990

[54] EXECUTING DOWNLOADED USER PROGRAMS IN A PROGRAMMABLE CONTROLLER

[75] Inventors: John F. Dodds, Newbury; Steven M. Zink, Hudson, both of Ohio

[73] Assignee: Allen-Bradley Company, Inc., Milwaukee, Wis.

[21] Appl. No.: 430,078

[22] Filed: Nov. 1, 1989

Related U.S. Application Data

[63] Continuation of Ser. No. 45,690, May 1, 1987, abandoned.

[51] Int. Cl.$^5$ .............................. G06F 9/06
[52] U.S. Cl. .................. 364/900; 364/136; 364/949; 364/949.1
[58] Field of Search .................. 364/200, 900, 136

[56] References Cited

U.S. PATENT DOCUMENTS

| | | | |
|---|---|---|---|
| 4,176,403 | 11/1979 | Suzuki et al. | |
| 4,293,924 | 10/1981 | Struger et al. | |
| 4,413,319 | 11/1983 | Schultz et al. | |
| 4,442,504 | 4/1984 | Dummermuth et al. | 364/900 |
| 4,443,865 | 4/1984 | Schultz et al. | 364/900 |
| 4,486,830 | 12/1984 | Taylor, Jr. et al. | 364/146 |
| 4,510,565 | 4/1985 | Dummermuth | |
| 4,566,061 | 1/1986 | Ogden et al. | 364/146 |
| 4,608,628 | 8/1986 | Saito et al. | 364/141 |
| 4,638,452 | 1/1987 | Schultz et al. | 364/900 |
| 4,663,704 | 5/1987 | Jones et al. | 364/147 |
| 4,691,296 | 9/1987 | Struger | 364/900 |
| 4,716,541 | 12/1987 | Quatse | 364/900 |
| 4,742,443 | 5/1988 | Rohn et al. | 364/136 |
| 4,751,672 | 6/1988 | Yamada | 364/900 |
| 4,802,116 | 1/1989 | Ward et al. | 364/900 |
| 4,809,217 | 2/1989 | Floro et al. | 364/900 |

Primary Examiner—Gareth D. Shaw
Assistant Examiner—John C. Loomis
Attorney, Agent, or Firm—Quarles & Brady

[57] ABSTRACT

A program in a higher-level language for a programmable controller is stored as a hex-coded file in a memory in a main processor unit. The file is downloaded to a processor-based I/O logic module that translates the program into a multi-table data structure for relating the state of output devices on controlled equipment to the state of input devices on the equipment. After translation, an I/O control routine of lower-level, machine-language processor instructions is executed every 500 microseconds to control the output devices in response to changing conditions at the input devices and in response to the output functions embedded in the data structure as a result of translating the downloaded program. In a first embodiment the higher-level language is of the ladder-diagram type, while in a second embodiment the higher-level language incorporates state transition logic.

30 Claims, 23 Drawing Sheets

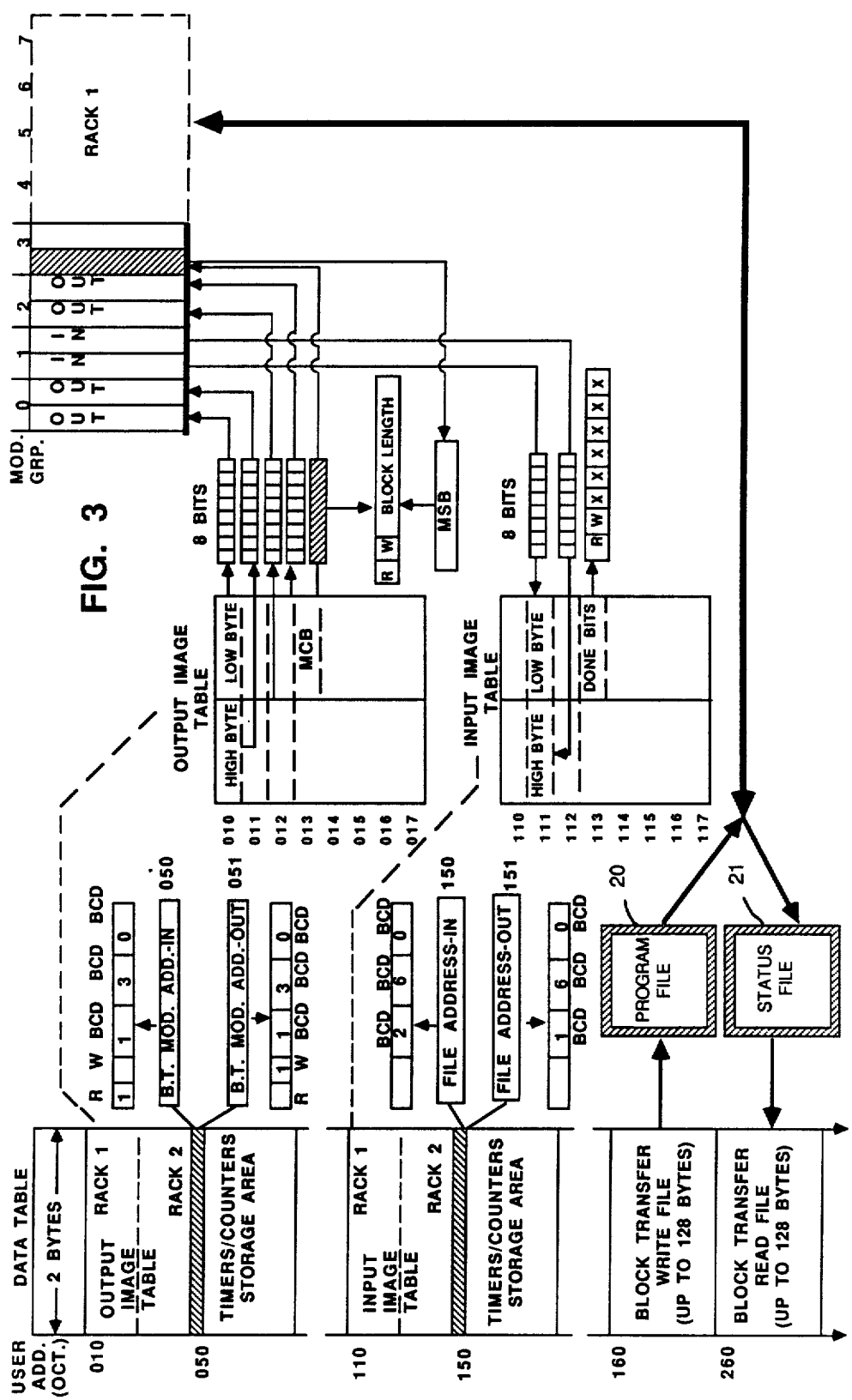

```
                                        +---------------+   013   |
    +-------------------------------+ BLOCK XFER READ +  --(EN)- -+
    |                               | DATA ADDR:    0050 |   07   |
    |                               | MODULE ADDR:   130 |        |
    |                               | BLOCK LENGTH:   00 |  113   |
    |                               | FILE:    2600—2677 +  --(DN)- -+
    |                               +---------------+   07   |
    |
    |   113           BUFFER FILE   +---------------+  0061   |
    +----] [---------------------- + FILE TO FILE MOVE +  --(EN)- -+
    |   07   READ DONE BIT          | COUNTER ADDR: 0061 |   17   |
    |                               | POSITION:      001 |        |
    |                               | FILE LENGTH:   010 |  0061  |
    |                               | FILE A:  2600—2611 +  --(DN)- -+
    |                               | FILE R:  2500—2511 |   15   |
    |                               | RATE PER SCAN: 010 |        |
    |                               +---------------+        |
    |
    |                               +---------------+   013   |
    +-------------------------------+ BLOCK XFER WRITE +  --(EN)- -+
    |                               | DATA ADDR:    0051 |   06   |
    |                               | MODULE ADDR:   130 |        |
    |                               | BLOCK LENGTH:   00 |  113   |
    |                               | FILE:    1600—1677 +  --(DN)- -+
    |                               +---------------+   06   |
    |                               +---------------+  0060   |
    +    .FOR DISPLAY PURPOSES ONLY.+ FILE TO FILE MOVE +  --(EN)- -+
    |                               | COUNTER ADDR: 0060 |   17   |
    |                               | POSITION:      001 |        |
    |                               | FILE LENGTH:   044 |  0060  |
    |                               | FILE A:  1600—1653 +  --(DN)- -+
    |                               | FILE R:  1700—1753|   15   |
    |                               | RATE PER SCAN: 044 |        |
    |                               +---------------+        |
```

FIG. 4

| PROGRAMMING INSTRUCTION | UPPER BYTE | | LOWER BYTE | |
|---|---|---|---|---|
| 1. NOP | 0 | 0 | 0 | 0 |
| 2. INIT | 0 | 0 | 0 | 1 |
| 3. HALT | 0 | 0 | 0 | 2 |
| 4. EXECUTE | 0 | 0 | 0 | 3 |
| 5. SET ID  CMD | 0 | 0 | 0 | 4 |
| DATA | ADDRESS | | POINTER | |

OTE, OTL, OTU, CTR, TEC, TRS

| | |
|---|---|
| WORD 1 | COMMAND WORD ( 0 0 C C ) |
| WORD 2 | OUTPUT ID BYTE (11111111) \| POLARITY (0 0 0 P) \| SELECT (0 0 S S) |
| WORD 3 | FIRST INPUT BRANCH — INPUT SELECT BITS \| POLARITY BITS |
| WORD 4 | NEXT INPUT BRANCH (IF REQUIRED) — INPUT SELECT BITS \| POLARITY BITS |

FIG. 6 c

CTU, CTD

| | |
|---|---|
| WORD 1 | COMMAND WORD ( 0 0 C C ) |
| WORD 2 | OUTPUT ID BYTE (11111111) \| POLARITY (0 0 0 P) \| SELECT (0 0 S S) |
| WORD 3 | PRESET VALUE ( 4-DIGIT BCD ) |
| WORD 4 | ACCUMULATED VALUE ( 4-DIGIT BCD ) |
| WORD 5 | FIRST INPUT BRANCH — INPUT SELECT BITS \| POLARITY BITS |
| WORD 6 | NEXT INPUT BRANCH (IF REQUIRED) — INPUT SELECT BITS \| POLARITY BITS |

FIG. 6 d

TMR

| | |
|---|---|
| WORD 1 | COMMAND WORD ( 0 0 C C ) |
| WORD 2 | OUTPUT ID BYTE (11111111) \| POLARITY (0 0 0 P) \| SELECT (0 0 S S) |
| WORD 3 | TIMER VALUE ( 4-DIGIT BCD ) |
| WORD 4 | FIRST INPUT BRANCH — INPUT SELECT BITS \| POLARITY BITS |
| WORD 5 | NEXT INPUT BRANCH (IF REQUIRED) — INPUT SELECT BITS \| POLARITY BITS |

LADDER DIAGRAM FORMAT

| USER PROGRAM SOURCE CODE | HEX CODE EQUIVALENT |
|---|---|
| INIT | 0001 |
| CTU | 0013 |
| OUTPUT 0 | FF00 |
| PRESET VALUE | 1000 |
| ACC. VALUE | 0850 |
| FIRST INPUT BRANCH | C707 |
| NEXT INPUT BRANCH | 8880 |
| NEXT INPUT BRANCH | 3830 |
| CTD | 0014 |
| OUTPUT 0 | FF00 |
| PRESET VALUE | 1000 |
| ACC. VALUE | 0850 |
| FIRST INPUT BRANCH | 7A00 |
| NEXT INPUT BRANCH | 8404 |
| CTR | 0015 |
| OUTPUT 0 | FF00 |
| INPUT BRANCH | 0100 |
| OTE | 0010 |
| OUTPUT 1 | FF01 |
| INPUT BRANCH | 5744 |
| OTL | 0011 |
| OUTPUT 2 | FF02 |
| FIRST INPUT BRANCH | 4B40 |
| NEXT INPUT BRANCH | 1000 |
| OTU | 0012 |
| OUTPUT 2 | FF02 |
| INPUT BRANCH | 1818 |
| TMR | 0017 |
| OUTPUT 3 | FF03 |
| TIME | 9125 |
| INPUT BRANCH | 8181 |
| TEC | 0016 |
| OUTPUT 3 | FF03 |
| FIRST INPUT BRANCH | 2E02 |
| NEXT INPUT BRANCH | 4E02 |
| TRS | 0018 |
| OUTPUT 3 | FF03 |
| INPUT BRANCH | 8000 |
| SETIF | 0030 |
| INPUTS 0 AND 1 | 0000 |
| INPUTS 2 AND 3 | 9999 |
| INPUTS 4 AND 5 | 0850 |
| INPUTS 6 AND 7 | 2500 |
| EXECUTE | 0003 |
| TOTAL HEX WORDS | 44 |
| MAXIMUM FILE WORDS | 64 |

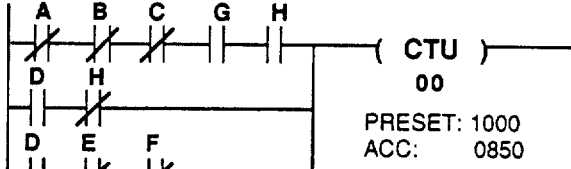

STATE TRANSITION OUTPUTS (STO)

| COMMAND WORD ( 0 0 2 0 ) |||
|---|---|---|
| STATE (0 0 0 0 P P P P) | X X X X | OUTPUTS (B B B B) |
| NEXT STATE (0 0 0 0 P P P P) | X X X X | OUTPUTS (B B B B) |
| NEXT STATE (0 0 0 0 P P P P) | X X X X | OUTPUTS (B B B B) |

FIG. 10b

STATE TRANSITION (STT)

| COMMAND WORD ( 0 0 2 1 ) ||
|---|---|
| PRES. STATE (0 0 0 0 P P P P) | NEXT STATE (0 0 0 0 N N N N) |
| INPUTS ||
| INPUT SELECT BITS | POLARITY BITS |

FIG. 11

STATE TRANSITION USER PROGRAM

| USER PROGRAM SOURCE CODE | HEX CODE EQUIVALENT | COMMENT |
|---|---|---|
| INIT | 0001 | INITIALIZE INSTRUCTION |
| STO | 0020 | STATE OUTPUT DEFINITION |
| 1/1 | 0101 | STATE 1, OUTPUTS = 01 |
| 2/3 | 0203 | STATE 2, OUTPUTS = 03 |
| 3/7 | 0307 | STATE 3, OUTPUTS = 07 |
| STT | 0021 | TRANSITION FROM |
| 1→2 | 0102 | STATE 1 TO STATE 2 |
| FOR INPUTS | FFFD | FOR INPUTS = |
| $\bar{A}\,B\,C\,D\,E\,F\,\bar{G}\,H$ | | $\bar{A}\,B\,C\,D\,E\,F\,\bar{G}\,H$ |
| STT | 0021 | TRANSITION FROM |
| 1→3 | 0103 | STATE 1 TO STATE 3 |
| FOR INPUTS | FFFC | FOR INPUTS = |
| $\bar{A}\,B\,\bar{C}\,D\,E\,F\,\bar{G}\,H$ | | $\bar{A}\,B\,\bar{C}\,D\,E\,F\,\bar{G}\,H$ |
| STT | 0021 | TRANSITION FROM |
| 2→1 | 0201 | STATE 2 TO STATE 1 |
| FOR INPUTS | FFFE | FOR INPUTS = |
| $A\,B\,C\,D\,E\,F\,\bar{G}\,H$ | | $A\,B\,C\,D\,E\,F\,\bar{G}\,H$ |
| STT | 0021 | TRANSITION FROM |
| 2→3 | 0203 | STATE 2 TO STATE 3 |
| FOR INPUTS | FFFC | FOR INPUTS = |
| $A\,B\,\bar{C}\,D\,E\,F\,\bar{G}\,H$ | | $A\,B\,\bar{C}\,D\,E\,F\,\bar{G}\,H$ |
| STT | 0021 | TRANSITION FROM |
| 3→1 | 0301 | STATE 3 TO STATE 1 |
| FOR INPUTS | FFFE | FOR INPUTS = |
| $A\,B\,C\,D\,E\,F\,G\,H$ | | $A\,B\,C\,D\,E\,F\,G\,H$ |
| STT | 0021 | TRANSITION FROM |
| 3→2 | 0302 | STATE 3 TO STATE 2 |
| FOR INPUTS | FFFD | FOR INPUTS = |
| $\bar{A}\,B\,C\,D\,E\,F\,G\,H$ | | $\bar{A}\,B\,C\,D\,E\,F\,G\,H$ |
| EXECUTE | 0003 | EXECUTE PROGRAM |

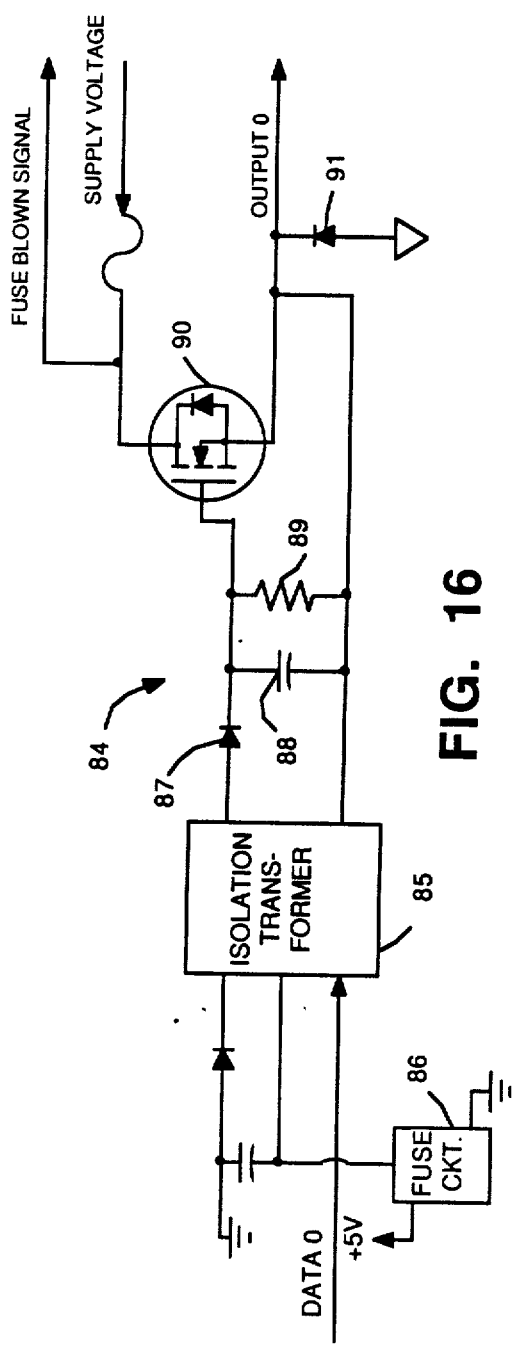
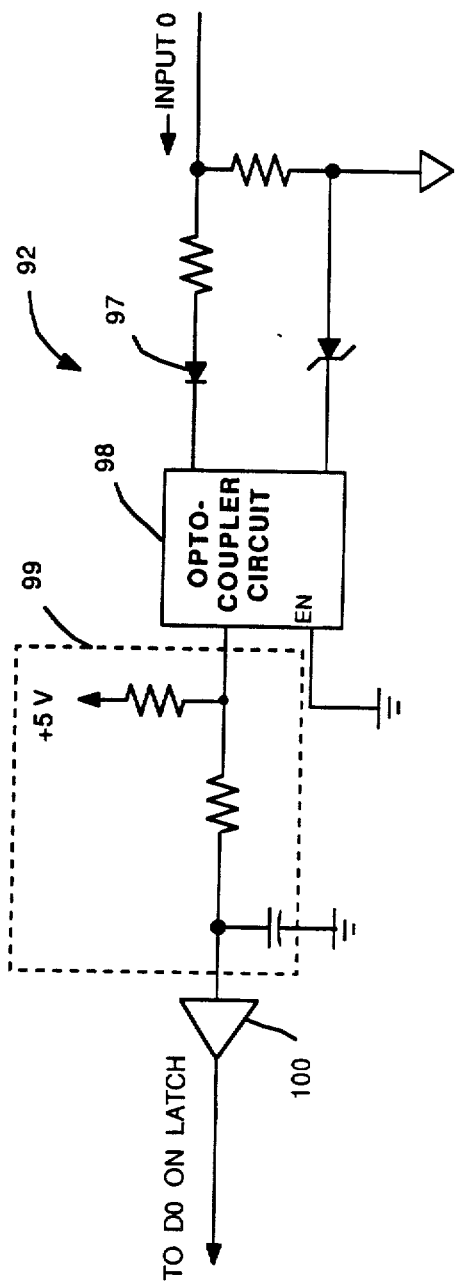
FIG. 16
FIG. 17

EXECUTING DOWNLOADED USER PROGRAMS IN A PROGRAMMABLE CONTROLLER

This application is a continuation of application Ser. No. 07/045,690, filed May 1, 1987 now abandoned. Microfiche Appendix B with 2 microfiche containing 84 frames and Microfiche Appendix C with 4 microfiche containing 228 frames are incorporated herein.

BACKGROUND OF THE INVENTION

1. Field of the Invention

The invention relates generally to digital controllers for controlling industrial machines and processes, and more particularly, to programmable controllers.

2. Description of the Prior Art

In the simplest system architecture for a programmable controller, the controller includes a processor module and several I/O modules which are supported in the same equipment rack and electrically connected through a backplane circuit board. The processor executes an I/O scan to read input status data from input modules and to transmit output status data to the output modules. The input status data represents the state (such as "on" or "off") of input devices on the equipment being controlled while the output status data represents the state (such as "on" or "off") which is signalled to the output devices on the equipment being controlled. The processor also executes a program scan in which user program instructions are executed to examine the input status data and to set the output status data according to the logic contained in the program instructions.

In a system with a single rack and a processor located in the rack, the time between the sensing of input devices and the setting of output devices is relatively short. In larger systems, both the I/O scan and the program scan require more time.

In the system architecture shown and described in Schultz et al., U.S. Pat. No. 4,413,319, issued Nov. 1, 1983, a programmable controller includes a stand-alone main processor and a number of "remote" I/O racks strung out along serial communication channels. The scanner module in the Schultz et al. patent sends I/O status data to adapter I/O modules residing in remote I/O racks. The data passes through the adapter modules to the I/O modules, the adapter modules being transparent to the exchange between the scanner module and the I/O modules.

In the Schultz system neither the adapter modules nor the I/O modules possess the ability to execute a control program to alter the I/O status data, which is a characteristic of the main processor. Because I/O status data must be sent back and forth to the main processor unit for execution of the control program, system response time is a function of the number of I/O points in the system, and of length of the control program in the main processor unit.

There is a need for programmable controller equipment that is suitable for high-speed manufacturing systems such as bottling and canning, sorting of material on conveyors, presence sensing of fast moving objects and counting material flow. Prior equipment has not been suitable, particularly due to the length of the I/O scan or update time for the output devices.

The invention relates to a method and to circuitry for providing closed-loop digital control of high speed equipment. Instructions are received by an I/O module from a processor-based program node and related to other instructions on the I/O module that control the state of an output in response to signals from a plurality of inputs.

Preferably, the instructions received by the I/O module are in a higher-level language. These instructions are translated into a data structure that relates commanded states for selected outputs on the I/O module to the logical states of the inputs on the I/O module. After translating these higher-level instructions, a group of lower level instructions is executed to control the outputs in response to signals from the inputs according to the commanded states in the data structure.

The data structure may take the form of several tables which control the "on" and "off" states of the outputs according to the logic of the higher-level instructions. The tables combine the various functions of the higher-level instructions.

The circuitry of the invention is incorporated in the I/O module. This includes circuitry for receiving a program downloaded from a controller processor, for example, and circuitry for communicating the program to a storage circuit. It may also include a processor for translating the instructions in the higher-level language to a data structure that relates the state of outputs on the I/O module to the state of the inputs on the I/O module. The processor reads the logical states for the outputs in response to logical states generated from the inputs to close a control loop from the inputs to the outputs of the I/O module.

The I/O logic module can be inserted into an equipment rack and connected to a rack backplane to receive a user control program downloaded from the main processor. While real-time control is being handled at the I/O interface, status data is periodically returned to the PC main processor unit which maintains general supervision and monitoring of the full programmable controller system. The main processor unit may also be performing real-time control of devices on a controlled system that are less time-sensitive than those controlled by the circuitry of the invention.

One object of the invention is to receive, translate and execute user programs which operate according to Boolean logic incorporated in ladder diagram programs of the type used in programmable controllers.

Another object of the invention is to receive, translate and execute user programs which operate according to a state transition function.

Another object of the invention is to enable on-line replacement of one user program with a newly downloaded user program. This is accomplished with special programming instructions for stopping execution of the previous program and starting execution of the new program after it has been translated.

Another object of the invention is to download user programs in a single file for faster implementation of the program and for maintenance of data integrity within the program.

These and other objects and advantages of the invention will become apparent from the following description in which reference is made to the accompanying drawings and to the appendices, which form a part hereof, and in which there is illustrated by way of example, two examples of a preferred embodiment of the invention. These examples do not necessarily represent the full scope of the invention, however, and reference is made to the claims that follow the description for

BRIEF DESCRIPTION OF THE DRAWINGS

FIG. 3 is a map diagram showing the transfer of a program file from the PC processor to the I/O logic module of FIGS. 1 and 2;

FIG. 4 is a schematic of a ladder diagram program instructions to accomplish the file transfer represented in FIGS. 2 and 3;

FIGS. 6a–6d are maps of general programming instructions and three groups of ladder diagram instructions used in the program file of FIGS. 1 and 2;

FIG. 7 is a diagram showing a program of the ladder-diagram type that is entered in the program file of FIGS. 1 and 2;

FIGS. 10a and 10b are maps of state transition instructions used in a state transition program downloaded to the I/O logic module of FIGS. 1 and 2;

FIG. 11 is a source code listing of a state transition program and its hex-code equivalent;

FIG. 16 is a detail schematic of one of the output circuits seen in FIG. 15;

FIG. 17 is a detail schematic of one of the input circuits seen in FIG. 15;

DETAILED DESCRIPTION OF THE PREFERRED EMBODIMENTS

A. The Programmable Controller System

Figure 1:
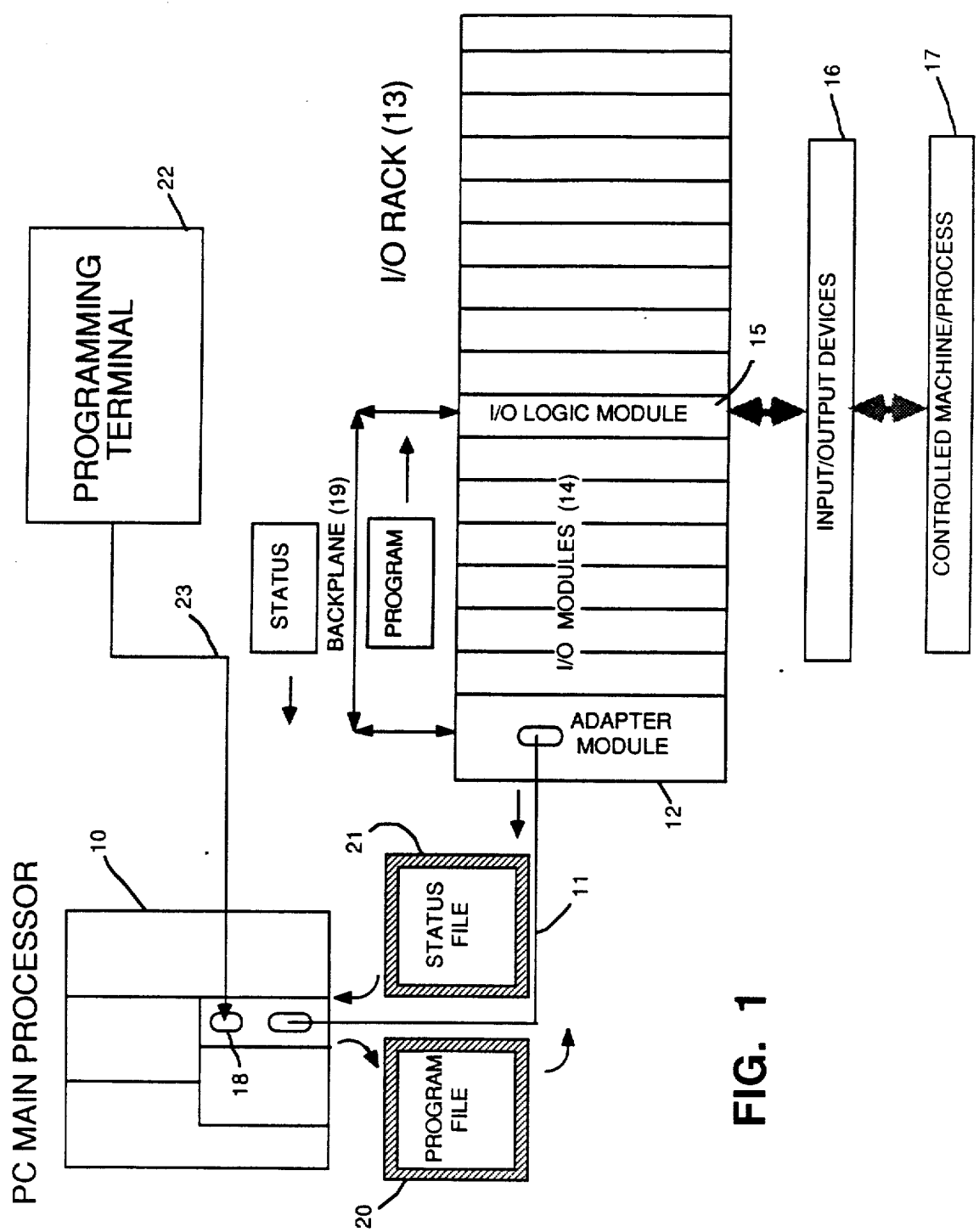
FIG. 1 is a block diagram of a programmable controller system that incorporates the present invention.

FIG. 1 shows a programmable controller system which incorporates the invention. A main processor unit 10 is connected via a serial communication cable 11 to a remote I/O adapter module 12 in an equipment rack 13. A group of I/O modules 14, including an I/O logic module 15, are also connected in the equipment rack 13.

The general functions of the processor unit 10 and the I/O modules 14 are well known to those skilled in the art. The processor unit 10 executes a control program, sometimes also referred to as a user's application program, because the program is developed in a user program language for one of many possible industrial applications. In executing the program, the processor unit 10 generates output status data in response to the state of input status data according to the logic contained in the user control program.

At some predetermined time, in this instance between cycles of control program execution, the processor unit 10 executes an I/O scan in which input status data is read from those of the I/O modules 14, 15 that are input modules, and output status data is written to those of the I/O modules 14, 15 that are output modules. The I/O logic module 15 is both an input module and an output module.

The I/O modules 14, 15 that are input modules convert AC and DC signals from input devices, such as sensors, limit switches and push-buttons, to digital logic-level signals that can be stored as input data. The I/O modules 14, 15 that are output modules convert digital logic-level signals to AC and DC signals for operating output devices such as relays and solenoids. The I/O modules 14, 15 connect to these input and output devices 16 through swing-arm connectors with screw-type terminals (not shown) of a type well known in the art. The input and output devices 16 are attached to the controlled machine or process 17.

The I/O modules 14, 15 are inserted into slots in the equipment rack 13 and plug into edge connectors (not shown) mounted on a backplane circuit board, or simply "backplane" 19, which extends across the back side of each rack 13 as shown schematically in FIG. 1. The backplane 19 includes a large number of circuit paths or "traces" extending horizontally to interconnect the adapter module 12 to each of the I/O modules 14, 15 in the rack 13. A group of these circuit paths form a byte-wide parallel data bus for carrying bytes of I/O status data back and forth between the modules.

The invention concerns a method and apparatus for distributed control systems in which a user application program of the type normally executed by the main processor unit 10 is downloaded to the I/O logic module 15. A program file 20 is downloaded via a file transfer technique referred to as a "write block transfer". The program file 20 is handled in transparent fashion by the adapter module 12 so that it is transferred across the backplane to the I/O logic module 15. For further description of the implementation of read and write block transfer techniques, reference is made to Struger et al., U.S. Pat. No. 4,293,924, issued Oct. 8, 1981, and to Schultz et al., U.S. Pat. No. 4,413,319, issued Nov. 1, 1983.

The advantage of distributed control is that—with the control of machinery operating in a real time environment—the response to new input data will be faster if the new input data does not have to be transmitted over long distances with new output status data being returned over the same long distances. By executing the user application on the I/O logic module 15, control tasks which require fast response can be processed at the equipment rack 13, which is typically located close to the machine or process 17. This improves system response time for controlling bottling and canning lines, sorting of material on conveyors, sensing of fast moving objects and counting material flow.

As seen in FIG. 1, a status file 21 is returned to the main processor unit 10 through the backplane 19, the adapter module 12 and the serial communication cable 11. This is accomplished by executing a "read block transfer". The status file 21 may include data for connecting the first program file 20 to a second program file when a lengthy user program is downloaded. The status file 21 also contains data that allows the main processor unit to monitor overall operation of the system on a "near" real time basis.

Also represented in FIG. 1 is a programming terminal 22 through which user application programs are entered into the main processor unit 10. The programming terminal 22 is connected to the main processor unit 10 by a communication cable 23 that connects to a programming port 18 on the main processor unit 10. It should be understood, however, that in other embodiments the programming terminal 22 and the main processor unit 10 might be combined in the form of a suitably programmed personal computer. The term "processor-based program node" shall mean a main processor unit 10, a programming terminal 22, a personal computer or other equivalent device for entering user programs into a processor for communication to the I/O logic module 15.

Figure 2:
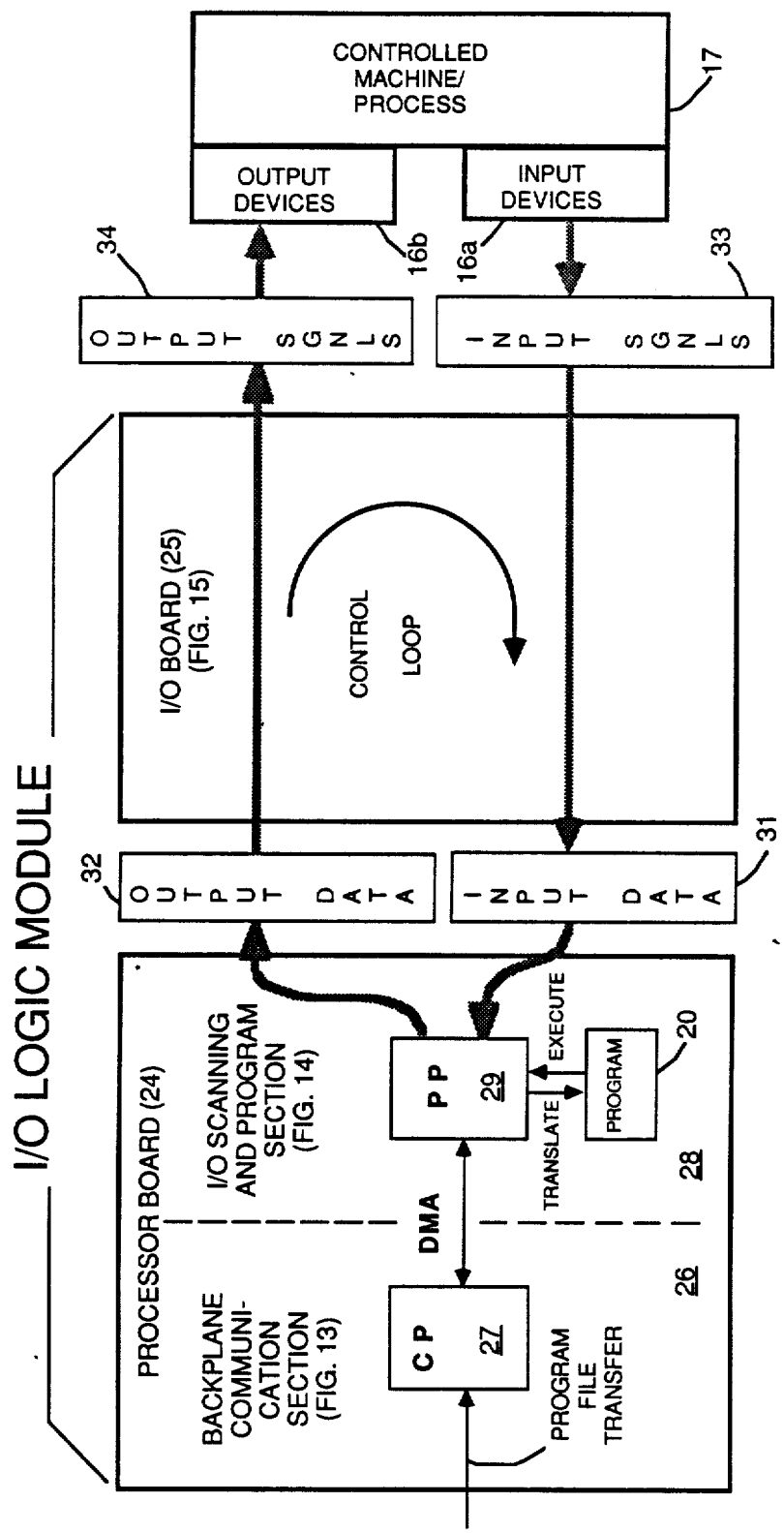
FIG. 2 is a block diagram of an I/O logic module of the present invention.

FIG. 2 shows the primary elements of the I/O logic module 15. The module 15 is comprised of two circuit boards: a processor board 24 and an I/O board 25. The processor board 24 has a backplane communication section 26 which connects to primary buses on the backplane 19. This section operates under the control of a communication processor (CP) 27 to receive program files 20 downloaded from the main processor unit 10 and to return the status files 21. The processor board 24 also has an I/O scanning and program section 28 which is connected through secondary buses on the backplane to the I/O board 25. This section 28 operates under the control of a program processor (PP) 29.

The communications processor 27 and the program processor 29 communicate via a method of DMA (direct memory access) transfer. This method is used in transferring files 20 back and forth between a memory associated with the communications processor 27 and a memory associated with the program processor 29. As will be explained in more detail below, the program file(s) 20 contain hex-coded instructions. The program processor 29 translates these instructions into a form that can be quickly and directly executed to change the state of outputs in response to the changing state of inputs and the logic in the program instructions. The translated program is stored in memory and activated for execution by a particular programming instruction.

Besides executing the user application program, the program processor 29 periodically executes an I/O scan routine to read input data 31 through the I/O board 25 and to write output data 32 through the I/O board 25. The I/O board 25 converts the digital output data 32 to output signals 34 of the type applicable to the output devices 16b and the I/O board 25 converts input signals 33 of the type applicable to the input devices 16a to digital input data 31. It can be seen from this description and from FIG. 2, that the control loop is closed through the program processor 29.

B File Transfer of Program and Status Files

FIG. 3 shows the general organization of a data table of the type stored by the main processor unit 10. To simplify explanation, the diagram in FIG. 3 has been drawn as if the main processor unit 10 were connected directly through the backplane of the equipment rack 13, rather than through the adapter module 12. The I/O status data is divided into output status data, which is stored in an image table beginning at "010" (octal), and input status data, which is stored in an image table beginning at "110" (octal). (The octal numbering system is used in user application programs to identify input and output addresses.)

As seen in the expansion of these two image tables, each addressable location in memory stores two bytes of I/O status data: a low byte and a high byte. During the input/output scan operation, output data is transmitted to output modules, which are organized in pairs or "module groups" for addressing purposes. Each full rack includes eight module groups numbered from: 0–7 (octal). If, for example, two output modules are located in Module Group 0 of Rack 1, then a low byte will be transmitted to the first one and a high byte will be transmitted to the second one, assuming they are of byte-sized capacity. To continue the example, if two input modules are located in Module Group 1 of Rack 1, a low byte of input status data will be read from the first one, and a high byte of input status data will be read from the second one, and these two bytes will be received and stored in corresponding locations in the input image table. A place is reserved in both the output image table and the input image table for each physical I/O location so that either an input module or an output module can be placed in any location in the equipment rack 13.

Discrete transfer of I/C status data is a type of memory-mapped input/output addressing in which the individual bytes or words of I/O status data are related according to their sequence to a corresponding group of I/O modules. At some point along the path of communication, it is normally contemplated that these be coupled to I/O modules in a hardware-implemented signalling sequence, which is initiated by executing a set of instructions for a microprocessor referred to as an I/O scan sequence.

FIG. 3 also illustrates a "block transfer" to the I/O logic module 15 in the low byte position in Module Group 3 in Rack 1. The block transfer is controlled by a more elaborate sequence of microprocessor instructions and by parameters which are supplied by the user in the user-language application program. The first of these is a module control byte (M(B) which is stored in the output image table location "013" (low), so that it will be transmitted to the block transfer module (shaded area in Rack 1 in FIG. 3). This word is actually a "byte" with read and write flag bits as the high order bits "6" and "7", followed by a "block length" number of six bits. This number indicates how many byte words of I/O status data will be transmitted as a block to the single I/O address occupied by the I/O logic module 15.

A second parameter that is provided by the user for execution by the block transfer programming is a data address (050), where a third parameter provided by the user—the I/O address of the block transfer module—is stored. The data address is preferably the first location in a timers and counters area, which is then searched by the block transfer program to find the I/O address. If the block transfer module is bidirectional, one address is stored for input and one address is stored for output, as shown at locations "050" and "051" (octal) in FIG. 3. The address word format includes "read" and "write" direction flags and three binary-coded decimal numbers specifying the I/O address.

A fourth parameter that is provided by the user for execution by the block transfer programming is a file address where the block of I/O status data can be stored, as it is too large to be stored in the image table. This address is stored at an address in a second timers and counters area that will be automatically searched in response to the block transfer program and the user-provided data address. If the block transfer module is bidirectional, one address is stored for input and one address is stored for output, as shown at locations "150" and "151" (octal) in FIG. 3. The address word format includes three binary-coded decimal numbers specifying the file address. Here, the write file or program file address is "160" (octal) and the read file or status file address is "260" (octal).

The last parameter in the data table in FIG. 3 are the "done bits" which are stored in the input image location corresponding to the I/O address of the block transfer module. These are the "R" (read done) and "W" (write done) bits. The "X" bits are irrelevant.

FIG. 4 shows a portion of a user program—as it would appear on a screen of the programming terminal 22—for accomplishing the file transfer of the program file 20 and the status file 21. This section includes four "rungs". The first rung represents a block transfer read instruction for reading the status file 21. When this rung is encountered the read "enable" bit in the module control byte (MCB) which is stored at bit "07" location "013" (low) is enabled. This will keep the rung active until the read "done" bit at bit "07" of location "113" is set. Parameters for the block transfer including the data address, the I/O module address, the block length (part of the MCB) and the file address are also seen in the first rung. The number "00" for block length is a default block length of 64 words or 128 bytes, even though only ten words (twenty bytes) of the read file are utilized for status information.

The second rung represents a "file move" instruction so that after the status file 21 is received, it is transferred to another area of memory to prevent overwriting by a another incoming block of status data. The "file move" instruction is only executed upon the setting of read done bit.

The program file 20 is written to the I/O logic module 15 by executing the block transfer write instruction in the third rung. This instruction is started with the setting of the write "enable" bit at bit "06" of location "013" of the data table and is terminated by the setting of the write "done" bit at bit "06" of location "113" of the data table. As with the block transfer read instruction, the data address, the I/O module address, the block length (part of the MCW) and the file address are also shown in the instruction.

The fourth rung represents another "file move" instruction for maintaining a copy of the program file 20 for display purposes. For details of the "file move" instructions reference is made to the user programming manuals for the PLC-2 and PLC-3 Programmable Controller Systems available from Allen-Bradley Company, Inc., Highland Heights, Ohio.

File transfer with "block transfer" techniques requires mode program control than transferring discrete bytes of I/O status data through an I/O scan sequence. The advantage of the block transfer mode is that allows a complete user program file to be downloaded in one block. For programs larger then the 64-word block size limit, several blocks can be linked using pointers returned in the status files 21.

Block transfer techniques have been used in prior systems to transfer files of I/O status data and in some cases control data. The present invention utilizes block transfer techniques to transfer user programs that will translated at their destination, before being executed.

Referring to FIG. 1, the program file 20 in this example contains 44 words or 88 bytes of program information. This information is in the form of hex-coded instructions as seen in the right-hand column of FIG. 7. The program file 20 is transferred to the adapter module 12 with a checksum. As the program file 20 is received at the I/O logic module, its bytes are added to form a checksum to be compared with the checksum transmitted from the main processor unit 10. If the program file 20 is transferred in a remote I/O system over a serial communication cable 11 as shown in FIG. 1, additional protocol information is added before and after the program file and checksum to form a "frame" of data that is communicated over the serial data channel. This protocol information is disclosed in Schultz et al., U.S. Pat. No. 4,413,319, cited earlier herein.

Figure 5:
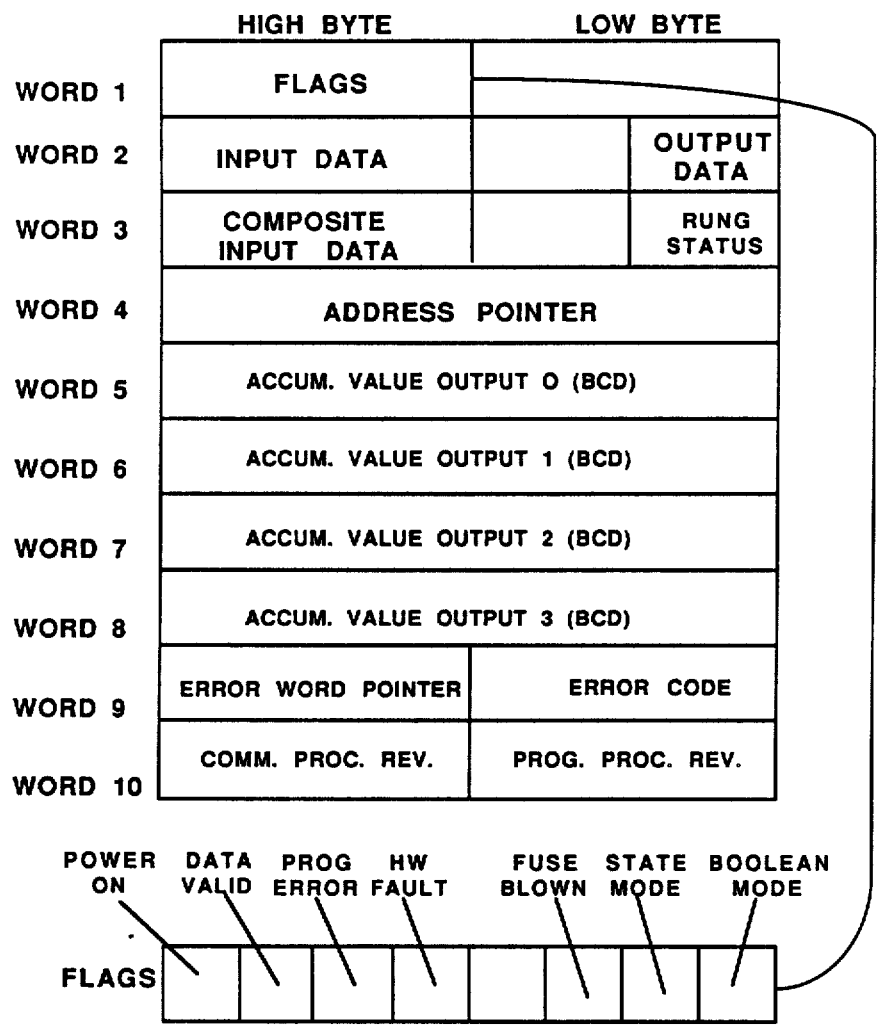
FIG. 5 is a map of a status data file returned from the I/O logic module in FIG. 1.

FIG. 5 shows the content of the status block 21. The high byte of Word 1 has a number of mode bits signalling power up, data valid, a user programming error, a hardware fault, a fuse blown and the two types of user programming, designated the state transition (STATE) mode and the BOOLEAN mode. The low byte of Word 1 is not used. The high byte of Word 2 contains input status bits for eight single-bit inputs on the I/O logic module 15. The low four bits of Word 2 contain four output status bits for four single-bit outputs on the I/O logic module 15. The high byte of Word 3 contains the logical values of the inputs which are used in the logic equations of the translated program. The low four bits of Word 3 contain the true or false status (rung status) of the four single-bit outputs on the I/O logic module 15.

An address pointer occupies the two bytes of Word 4. This address pointer is used when linking a first program file block to a second program file block. This pointer is actually downloaded to the I/O logic module 15 as part of the first program block in what is referred to as a SET ID instruction. The pointer is then returned to the main processor unit 10 in a following status file block. The pointer address can be the file address of the second block in the data table containing program information related to a user program. The main processor unit 10 can be programmed to refer to this file address in executing the next block transfer write instruction.

After the address pointer, Words 5–8 of the status file each contain four (4) three-digit BCD values for the respective outputs. This provides for the return of accumulated values when the outputs are controlled by counter instructions in user programs. Word 9 contains codes signalling various types of user programming errors that might occur and the location of such programming errors. Word 10 contains codes identifying the specific revisions of processors on the I/O logic module 15.

C. Programming in Ladder Diagram (Boolean) Language

FIGS. 6a–6d show the organization of information in individual program instructions that are entered into the main processor unit 10 by a user to form a program of the type seen in FIG. 7. FIG. 6a shows a set of general programming instructions which are used with each of two sets of more specialized instructions. The first set of these specialized instructions in FIGS. 6b–6d are in a ladder diagram or Boolean program language of the type familiar to users of programmable controllers. Referring to FIG. 6a the functions of the instructions represented by the mnemonics NOP, INIT, HALT, EXECUTE and SET ID are as follows:

NOP—This instruction allocates or reserves one word in a hex file where instructions can be added to the program at a later date. This command can also be used to delete instructions currently included in the body of a program.

INIT—This instruction clears any previously downloaded and translated program and starts the translation of a newly downloaded program.

HALT—This instruction terminates the ability of the outputs to change state and the outputs are held in their last state prior to this instruction.

EXECUTE—This instruction is placed at the end of a downloaded program so that, after the program is compiled into data tables, it will begin execution.

SET ID—This instruction includes an address that is sent from the main processor unit 10 to the I/O logic module with a first block of information and is then returned to the main processor unit as a pointer to a subsequent block of information related to the first block of information.

As seen in FIG. 6a the NOP, INIT, HALT and EXECUTE instruction each consist of a command operation code of two bytes. Each block represents four bits, which in hexadecimal notation can have a collective value from 0 to F (0 to 15 in decimal). The hex code value for the NOP instruction is 0000 (hex), the hex code value for the INIT instruction is 0001 (hex), and so on for the other instructions. The SET ID instruction includes both a two-byte command operation code and two bytes of data which follow the command operation code and which provide an address pointer to a related block of program data.

Referring next to FIGS. 6b–6d, the OTE, OTL, OTU, CTR, TEC, TRS, CTU, CTD and TMR mnemonics represent Boolean output instructions. One of these output instructions is included in each of the eight "rungs" in a ladder diagram program seen in FIG. 7. A "rung" completes a path from one vertical line to the opposite vertical line and may have several branches. The vertical lines represent the two terminals or lines of a power source and when a rung is logically "true" it is analogous to completing a circuit from one vertical line to the other.

The functions of the output instructions represented by the mnemonics OTE, OTL, OTU, CTR, TEC, TRS, CTU, CTD and TMR are as follows:

OTE—This instruction is executed to energize a one-bit output device when the execution of one or more input instructions in the rung of a ladder diagram produces a logic "true" result.

OTL—This instruction is executed to set an output to an ON state when the execution of one or more input instructions in the rung of a ladder diagram produces a logic "true" result for the rung. If the result is a logic "false", the output will be held in its last state.

OTU—This instruction is executed to set an output to an OFF state when the execution of one or more input instructions in the rung of a ladder diagram produces a logic "true" result. If the result is a logic "false" the output will be held in its last state.

CTU—This instruction is executed to energize an output when an accumulated count value reaches a preset value. The counter is incremented on each false-to-true transition of the rung of a ladder diagram containing the CTU instruction.

CTD—This output instruction is similar to the CTU instruction except that the counter is decremented. The output remains energized as the accumulated count is decremented toward the preset value. When the accumulated count becomes less than the preset value the output is de-energized.

CTR—This output instruction is used in conjunction with a CTU or CTD instruction to de-energize the output and reset the accumulated value to zero when the execution of one or more input instructions in the rung of a ladder diagram produces a logic "true" result for the rung.

TMR—This instruction is executed to start a programmed timer. The timer keeps running, even if the rung logic goes "false", until reset by a timer reset (TRS) instruction or until it reaches a preset time value. When it "times out", the output is energized.

TEC—This "timed event counter" instruction is a counter instruction that is associated with a TMR instruction. When the timer is reset through a TMR instruction, the accumulated value of this instruction is reset to zero. When the rung goes true the timer starts and will continue running. Each false to true transition of the rung is counted as one count. The count is terminated when the timer "times out" and the accumulated count can be returned to the main processor unit 10 in the status block 21.

The above instructions are all output instructions. Programmable controllers also utilize input instructions, such as EXAMINE ON (—| |—) and EXAMINE OFF (—|/|—). As seen in FIG. 7, the EXAMINE ON and EXAMINE OFF instructions are connected in series in one or more "branches" of each rung. In the first branch of the first rung the instructions read as follows: EXAMINE INPUT A OFF, EXAMINE INPUT B OFF, EXAMINE INPUT C OFF, EXAMINE INPUT G ON and EXAMINE INPUT H ON. If all of these conditions are true, the branch is true and the rung is true so that the output CTU instruction will increment the counter by one count. There are two additional branches in the first rung which are parallel to the first branch and if all of the conditions in either branch are true the rung will also be true.

When input instructions are executed by the main processor unit 10, they are processed in a manner similar to the output instructions. In the present invention, the EXAMINE ON and EXAMINE OFF input instructions are coded in hexadecimal notation and included as information in the output instructions. Referring to FIG. 6c, it will be seen that the CTU instruction in the first rung of FIG. 7 includes the six words shown in FIG. 6c plus one additional word for the third input branch for a total of seven sixteen-bit words.

In FIG. 6b Word 1 is a command operation code for the instruction where the "C's" represents the BCD numbers in the lower byte that define the command code. Word 2 contains an output ID byte as the high byte. This byte is set to "11111111" (binary) to identify the instruction as an output instruction. The lower byte includes a polarity bit "P". A logic "1" in the polarity bit position will invert the state of the output between the state seen by the controller and the actual state of the output. The lower byte also includes two binary-coded output select bits "S S" to select Output 0, Output 1, Output 2 or Output 3. Word 3 in FIG. 6c is a four-digit binary-coded decimal number for the preset value of the counter. Word 4 is a four-digit binary coded decimal number for the accumulated value of the counter.

The branches of input instructions are contained in Word 5 and subsequent words, one word being used for each branch in the rung. The upper byte of each branch word has eight bits for selecting the active inputs A, B, C, D, E, F, G and H with the uppermost bit corresponding to input H and the lowermost bit corresponding to input A. For the first branch of the first rung in FIG. 7, the bit pattern for this byte is "1100 0111" which in hexadecimal notation is "C7". The lower byte of each branch word has eight bits for designating any of the active inputs A, B, C, D, E, F, G and H as having "low true" logic, and in the first branch those are inputs A, B and C. The bit pattern for the lower byte is "0000 0111" which in hexadecimal notation is "07". Thus as seen in FIG. 7, the first input branch is coded as "C707". Word 6 in FIG. 6c is coded in similar fashion for the second branch, and because there is a third branch in the first rung an additional input branch word, Word 7 would be required in FIG. 6c.

The organization of the other output instructions is similar to the CTU instruction. As seen in FIG. 6b, the OTE, OTL, OTU, CTR, TEC and TRS have the same format as the CTU and CTD instructions in Word 1 and Word 2. The instructions represented in FIG. 6b do not include the preset and accumulated value parameters, so the first two words are followed by words for one or more respective input branches. As seen in FIG. 6c, the TMR instruction also has the same format as the CTU and CTD instructions in Words 1 and 2. In Word 3 a four-digit BCD value represents a preset timer value. This word is followed by Word 4 and subsequent words for the respective input branches.

Referring to FIG. 7, a user program is shown in ladder diagram format with each of the output instructions used once. In the next column to the right is the program as it can be written in source code. The user can represent his program in either format, however, the general programming instructions such as INIT and EXECUTE appear only in the source code version. The user translates the program into its hex-code equivalent to produce the column at the right. The hex-coded program includes forty-four words which are entered in a program file 20 in the main processor unit 10 using the program terminal 22.

To recap the program seen in FIG. 7, the first instruction is an INIT instruction which clears any previously downloaded and translated program and starts the translation of a newly downloaded program. The next instruction is a seven-word CTU output instruction, which is followed by a six-word CTD instruction. This is followed by a three-word CTR instruction and then a three-word OTE instruction. The program continues with a four-word OTL instruction (two input branches) and a three-word OTU instruction. The TMR and TEC instructions are used together to form an eight-word segment of data, and this is followed by a three-word TRS instruction. After a five-word SETIF (non-Boolean) instruction, the program is terminated by the EXECUTE instruction.

Figure 8:
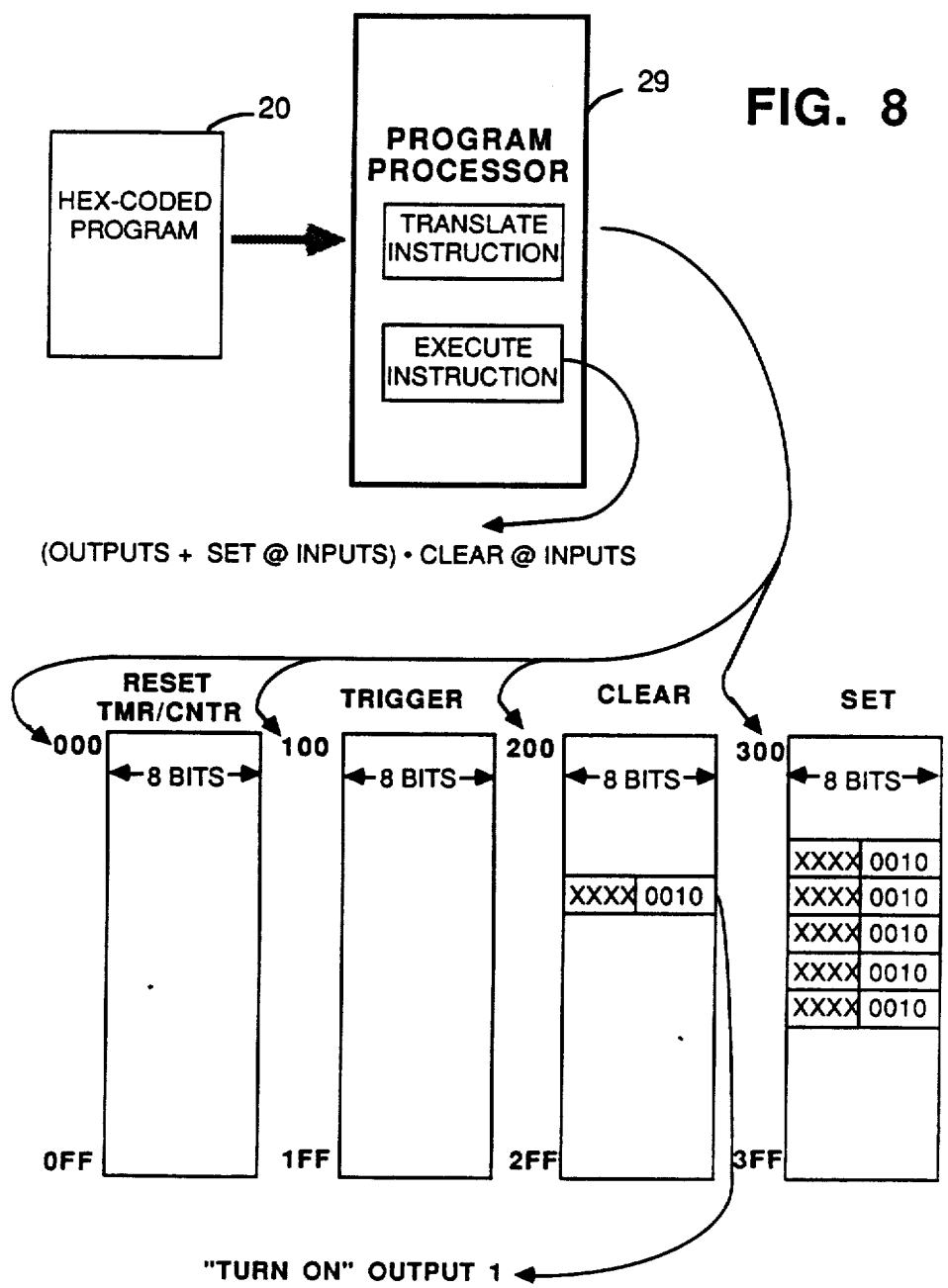
FIG. 8 is a diagram showing the translation of the user program of FIG. 7 to a data file structure for relating the status of outputs to the status of inputs.

Referring to FIG. 8, the hex-coded program file is downloaded via the file transfer method explained earlier and is transferred via DMA transfer to a memory accessible by the program processor 29. This processor 29 executes it own machine-language instructions to translate the hex-coded program into a data structure of several data tables seen in FIG. 8.

As used this description, the term "translate" shall mean the conversion of the hex-coded program file in a user application language to binary tables for relating the state of the outputs to the state of the inputs. Under the broad term of "translation" there are "interpreted" programs and "compiled" programs. In an "interpreted" program higher-level language program instructions are "translated" one at a time and then executed. In a "compiled" program the entire program of higher-level language instructions is "translated" before the program is executed.

The translation of the present invention is closer to a compilation because the entire program file 20 is translated to form the tables before the program is executed to control equipment. Compilation is typically used to denote a translation of higher level program instructions to machine-language instructions for a particular model of microelectronic processor. The present translation is a hybrid compilation which allows the use of a standard sequence of machine-language instructions in conjunction with the data tables shown in FIG. 8.

The tables in FIG. 8 include a SET table, a CLEAR table, a RESET TIMER/COUNTER table and a TRIGGER table. Each table has 256 entries running from 00 to FF in hexadecimal notation. The tables are formed in consecutive 256-byte pages in a RAM (random access memory) associated with the program processor 29. The RESET TIMER/COUNTER table has the lowest address, followed by the TRIGGER table, the CLEAR table and the SET table.

Each address in the tables corresponds to one of the 256 possible combinations for the collective state of the eight inputs on the I/O logic module 15. When the inputs are all at a logic low or "0" their collective state is "00000000" in binary or "00" in hexadecimal. By loading data representing the state of the outputs in each table address, the tables can be used to relate or map the state of inputs to the state of the outputs.

Because there are four outputs on the I/O logic module the lower four bits of each byte in the tables are used to represent the collective state of the outputs. The symbol "X" in the SET table means irrelevant data which can be a "binary 0" or a "binary 1" without affecting the result of an operation on the data.

The SET table, the CLEAR table, the RESET TIMER/COUNTER table and the TRIGGER table are compiled to handle the command functions of the various types of output instructions. In addition, there are table for storing the preset and accumulated values of timer and counter instructions, however, these have not been shown in FIG. 8.

Before an instruction can be translated, an INIT instruction must be executed to clear the contents of the SET, CLEAR, RESET and TRIGGER tables. During the time a new user program is being translated, the program processor 29 executes a timed I/O interrupt routine which will read the state of the inputs, but which will hold the outputs in a deenergized state referred to as "reset" state.

As a simple and hypothetical example of translation, the OTE instruction for Output 1 in Rung 4 of FIG. 7 can be translated into a set of data entries in one table. The bit pattern for the input branch of this instruction is "XOXI X011" where "X" can be either a "0" or a "1". There are eight addresses that meet this criterion, so eight lines in the table would be loaded with output data "0010". When the inputs meet the conditions of the input branch, during execution of the program, the program processor 29 would select one of these eight addresses to obtain the data. The data "0010" would then be logically OR'ed with the last state of the outputs. If the last state of the outputs is already the desired state ("0010"), then the instruction has responded to a logic true condition on a previous execution of Rung 4 of the program. If the last state of the outputs is "0000" (reset), the logical OR operation will produce a "0010" result, which will be converted to an output signal to cause energization of Output 1.

In the preferred embodiment, an OTE instruction (referred to in Appendix C as the COMBO instruction) is translated in a more indirect way using both the SET table and the CLEAR table. This occurs because the four tables represent a composite of all of the instructions in the program and it is desirable to handle the OTE instruction in the same way as OTL or OTU instructions which require two tables.

In translating an OTE instruction, four bits are set up to represent the four outputs. Thus, for the OTE 01 instruction in Rung 4 of FIG. 7, the data "0010" represents the selection of Output 1. In the SET table all of the bits corresponding to Output 1 are set to "1". Whatever the present state of Output 1, when it is OR'ed with the "1" data in the SET table, it will produce an unchanged result. It is therefore the CLEAR table which is set up to determine when the conditions at the inputs will require energization of Output 1.

To set up the CLEAR TABLE for the OTE 01 instruction, the program processor 29 initializes a pointer to point to "address 255" (FF in hex) in the CLEAR table. It then compares that address with the data defining the first input branch word seen in FIG. 6b to see if the bit pattern of the address "FF" includes the bit pattern of the inputs. It determines this in several steps. First, the program processor 29 performs a logical "exclusive-OR" operation on the address and the polarity data in the input branch word. Next, it takes this result and performs a logical AND operation on the input select bits in the input branch word. It then compares the result to the input select bits and if there is a match, the first address contains the bit pattern of the input branch. Data is then loaded into this location to select and energize Output 1.

The pointer is decremented to "254" (FE in hex) and this address is checked to see if it includes the bit pattern of the first input branch. The process is continued until address "00" in the CLEAR table is reached. This sequence of steps is repeated for subsequent input branches in the OTE instruction. This completes the formation of tables relative to the OTE 01 instruction. The table of addresses 00-FF will be examined again, however, in translating other instructions in the user program in FIG. 7.

When the program is translated, the EXECUTE instruction signals the program processor to allow execution of an I/O INTERRUPT ROUTINE. This accomplishes the real time or on-line control of inputs and outputs on a machine or process. The logical equation in FIG. 8 represents the execution of an OTE instruction. In this equation the "+" represents the "logic OR" function and the "·" represents the "logic AND" function.

Whenever the inputs meet the conditions of one of the input branches of the OTE 01 instruction, the program processor 29 will use the input data as an index to a location in the SET table and will perform a logical OR function on the contents of that location and data representing the last known state of the outputs. Since the SET table will have the bit for Output 1 set to "1" at all locations, the result will reflect the last state of Output 1. The program processor 29 also uses the input data as an index to a location in the CLEAR table. A logical AND function is performed on the result from the SET table and the data at the indexed address in the CLEAR table. The result of the AND operation will include a data bit that is converted to an output signal to cause energization of Output 1.

Instructions such as OTU, OTL, CTU, CTD and TEC also use data in the SET and CLEAR tables to turn outputs ON and OFF. The translation of the OTL instructions results in entries in the SET table which control the turning on of the output. The translation of the OTU instructions results in entries in the CLEAR table which control the turning off of the output. The translation of the CTU and TEC instructions results in entries in the SET table which control the turning on of an output and the translation of CTD instructions results in entries in the CLEAR table which control the turning on of an output.

The translation of the TRS and CTR instructions results in entries in the RESET TIMER/COUNTER table to signal the reset of an output. The translation of the TMR instruction results in entries in the TRIGGER table to start a timer at a specified output.

The translation routines, which are listed in Appendix C, provide other functions which are in addition to the basic functions of the Boolean instructions. For example, there is a limitation that each output can be programmed only once by the user for each type of Boolean instruction. A sixteen-bit flag word is provided with one-bit flags signalling the functions such as OTE, OTL, etc. for which an output has been programmed by the user. If a second instruction of the same type is encountered for the same output, this is detected by checking the flag word and a programming error will be signalled to the main processor unit 10 in the flag byte 21 seen in FIG. 5.

The translation routines have also been written to handle the three types of user instructions, general programming, Boolean and State Transition as a group, so instructions are included in each of the translation routines to prevent a mixed translation of Boolean and State transition instructions. For example, once a first instruction in a Boolean program is translated, the detection of an STO instruction or an STT instruction would be considered a programming error.

Thus, additional functions are provided in the actual program executed by the program processor, and for these functions reference is made to the routines in Appendix C.

D Programming for the State Transition Function

Figure 9:
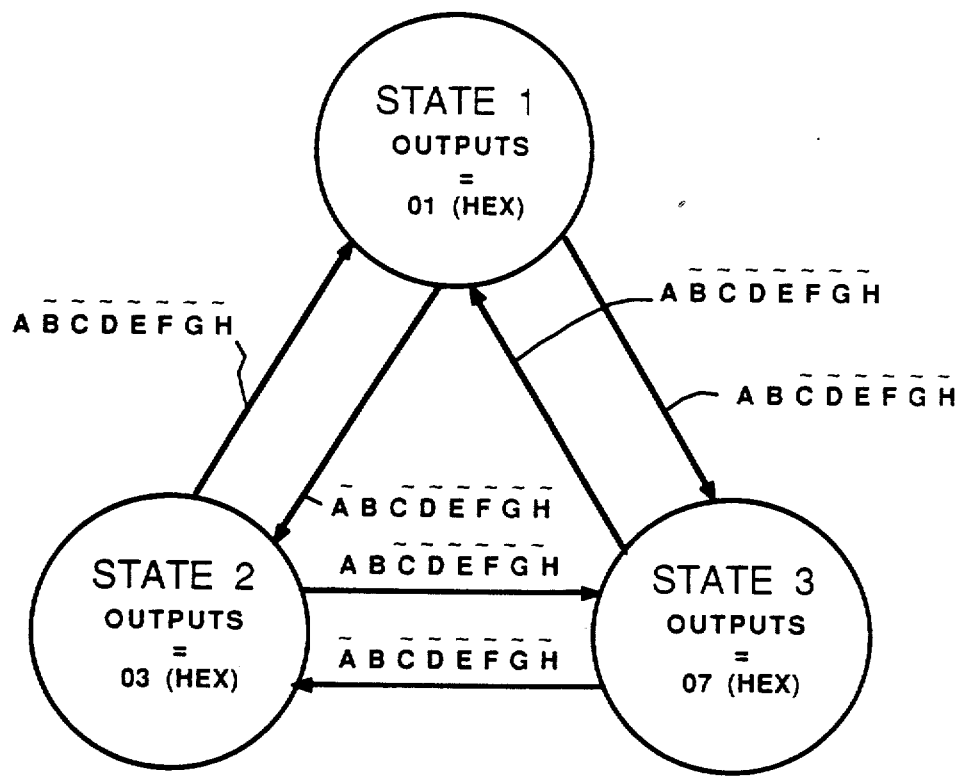
FIG. 9 is a state transition diagram illustrating the transition of a plurality of outputs from a first state to a second state in response to a corresponding state of a plurality of inputs.

When using a ladder diagram program, the state of inputs is related to the state of the outputs by Boolean logic. Other mathematical functions can also be employed to relate the state of the inputs to the state of the outputs. One of these is shown in FIG. 9 in the form of a state transition function. The three spheres represent Output State 1, Output State 2 and Output State 3. We shall assume for this example that the four outputs in State 1 are set to "0001" (Output 0 ON), in State 2 the outputs are set to "0011" (OUTPUTS 0 and 1 ON) and in State 3 the outputs are set to "0111" (OUTPUTS 0, 1 and 2 ON). In the state transition function, not only are the state of the inputs considered, but also the present state of the outputs. Thus, the response of the system to the eight inputs being "1111 1111" may be different when the system is currently in State 1 than would be the response to the inputs being "1111 1111" when the system is currently in State 2.

Each nonzero combination of outputs is assigned a State number from one to fifteen. Based on the condition of the eight inputs the system will transition from its present state to a next state.

In the simple example of FIG. 9, there are but three states. When the system is in State 1, it will transition to State 2 when the inputs H (most significant bit) through A (least significant bit) are "0000 0010" (02 hex). When the system is in State 1, it will transition to State 3 when the inputs H (most significant bit) through A (least significant bit) are "0000 0011" (03 hex).

When the system is in State 2, it will transition to State 1 when the inputs H (most significant bit) through A (least significant bit) are "0000 0001" (01 hex). When the system is in State 2, it will transition to State 3 when the inputs H (most significant bit) through A (least significant bit) are "0000 0011" (03 hex).

When the system is in State 3, it will transition to State 1 when the inputs H (most significant bit) through A (least significant bit) are "0000 0001" (01 hex). When the system is in State 3, it will transition to State 2 when the inputs H (most significant bit) through A (least significant bit) are "0000 0010" (02 hex).

Referring to FIG. 10, in the State transition program mode there are only two programming instructions in addition to the set of general programming instructions (INIT, EXECUTE) discussed earlier. These instructions are the state transition outputs (STO) instruction and the state transition (STT) instruction.

As seen in FIG. 10a, Word 1 of the STO instruction in the command operation code "0020" (hex). Word 2, upper byte, includes four bits ("PPPP") which are a binary-coded state such as "0001" for Output State 1. In the lower byte are four bits ("BBBB") to define the logic state of the outputs such as "0001" for OUTPUT 0 ON. Word 3 includes the state number "PPPP" for a second state (State 2 in relation to FIG. 9) and the logical condition of the outputs ("BBBB") in this state. Word 4 includes the state number "PPPP" for a third state (State 3 in relation to FIG. 9) and the condition of the outputs ("BBBB") in this state. Subsequent words can be added to the instructions for State 4 and subsequent output states up to State 15.

Referring to FIG. 10b, Word 1 of the STT instruction in the command operation code "0021" (hex). Word 2, upper byte, includes four bits ("PPPP") which are a binary-coded present state such as "0001" for Output State 1. In the lower byte are four bits ("NNNN") to define the next state of the outputs such as Output State 2 or Output State 3. Word 3 contains the condition(s) of the eight inputs that will cause the system to transition from present output state to the next defined output state. The inputs are coded in the same way that input branches were coded for Boolean logic programs. This coding results in an input branch being coded as the complement "FE" when the actual state of inputs that produce the state transition is "0000 0001".

Referring to FIG. 11, the left column illustrates a state transition user program in source code for the state diagram of FIG. 9. The middle column illustrates the translation of the program into a hex-code file for downloading from the main processor unit 10 to the I/O logic module 15. The right column contains comments which explain each instruction.

The first instruction in the program is an INIT instruction, which is the first instruction in all hex-coded files to be downloaded to the I/O logic module. The INIT instruction serves the same function as explained above for the Boolean logic program. The second instruction is an STO instruction of four words, the first word containing the command operation code and the next three words containing the definition of the three possible output states in this example. This is followed by six STT instructions, one for each possible state transition. The program is terminated by the EXECUTE instruction. The EXECUTE instruction serves the same function as explained above for the Boolean logic program.

Figure 12:
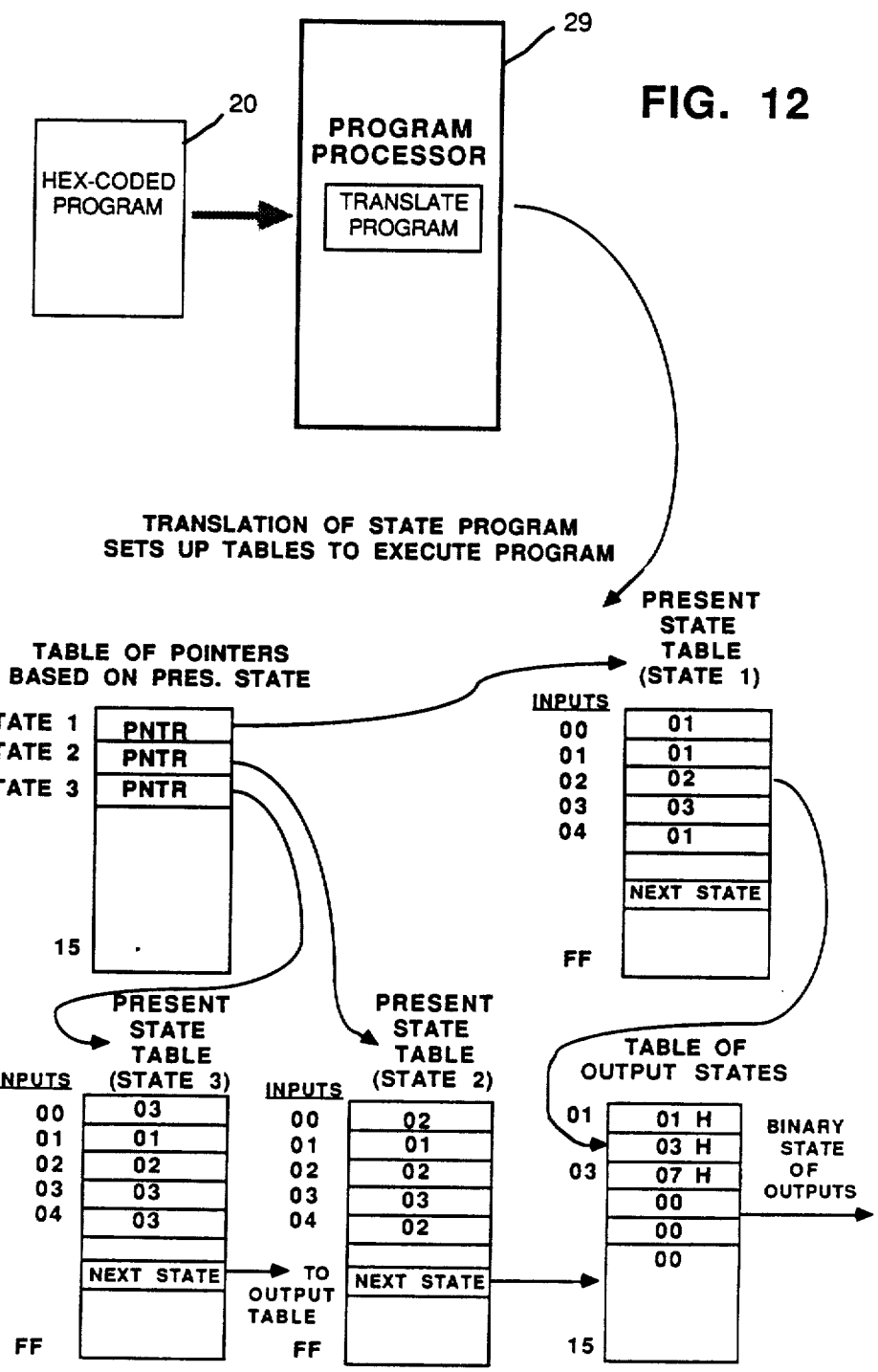
FIG. 12 is a diagram showing the translation of a state transition program to a data file structure for relating the status of outputs to the status of inputs.

FIG. 12 represents the downloading of the hex-coded program file 20. The program processor 29 executes decoding and translation routines to decode and translate the instructions in the program file 20. The decoding of the INIT instruction will cause the execution of any previous program to stop. The decoding of the INIT instruction will set up the tables seen in FIG. 12 with certain initial data. When the program processor 29 executes its machine language program to translate the STO and STT instructions, the data in the tables in FIG. 12 will be changed to reflect the results of the translation.

The decoding or translating of the STO instruction results in the loading of data into a TABLE OF OUTPUT STATES. Each output state 01-03 is used as an index within the table, so that location 01 in the table contains the binary state of the outputs ("01" in hex notation) for Output State 1, location 02 in the table contain the binary state of the outputs ("03" in hex notation) for Output State 2 and location 03 in the table contain the binary state of the outputs ("07" in hex notation) for Output State 3. The other Output States in the table will be loaded with "00" data up to location "15" (decimal notation). Data in TABLE OF OUTPUT STATES is read out and converted to signals for energizing and de-energizing the output devices connected to the outputs on the I/O module 15.

In decoding the STO instruction, the output state defined in the data word immediately following the command operation code in FIG. 10a is saved as the initial output state. Thus, if Output State 9 was to be added to the STO instruction in FIG. 11, and Output State 9 was to be the initial state, the data word for Output State 9 would follow the STO command operation code.

The decoding or translating of each STT instruction in FIG. 11 results in the forming of entries in three present state tables, one for State 1, another for State 2 and the other for State 3. For example, the decoding of the first STT instruction in FIG. 11 will provide the entry at relative location 02 (hex) in the STATE 1 TABLE. The state of the inputs (coded as "02") serves as index within the STATE 1 TABLE. The decoding of the second STT instruction in FIG. 11 will provide the entry at relative location "03" in the STATE 1 TABLE. Each present state table has 256 entries from "00" to "FF", however, in the simple example only two possible combinations of the eight inputs will cause a change of output state. The data stored in the two locations in the STATE 1 TABLE represents the next state to which the outputs should be set in response to the present output state being State 1 and in response to the state of the inputs. The data from the State 1 table is then used as an the index in the TABLE OF OUTPUT STATES to locate the actual output data.

In similar fashion, the decoding of the third and fourth STT instructions in FIG. 11 will provide the two entries seen at relative addresses "01" and "03" in the STATE 2 TABLE in FIG. 12. And, the decoding of the fifth and sixth STT instructions in FIG. 11 will provide the two entries seen at addresses "01" and "02" in the STATE 3 TABLE in FIG. 12. It is only coincidence in this example that the coded state of the inputs (01, 02 and 03) matches the next output state.

After all of the other instructions in the program file have been translated, the EXECUTE instruction is decoded or translated. When a timed interrupt occurs, the program processor 29 will execute an interrupt routine to read an initial output state and set the outputs to the initial state. When the next timed interrupt occurs, the program processor 29 will execute an I/O INTERRUPT ROUTINE for executing the state transition program. In executing this routine, the program processor 29 will use the present state as an index into a TABLE OF POINTERS seen in FIG. 12 to obtain the starting address of the appropriate PRESENT STATE TABLE. It then gets the input data to use as an index to a particular location in the selected PRESENT STATE TABLE as described above. It then uses the NEXT STATE data in the PRESENT STATE TABLE to form an index into the TABLE OF OUTPUT STATES where it obtains the output data for controlling the outputs. The TABLE OF POINTERS is stored in a PROM (programmable read only memory) associated with the program processor 29 while the other tables are set up and stored in a RAM (random access memory) that is accessed by the program processor 29.

E. I/O Logic Module Circuitry - The Processor Board

Figure 13:
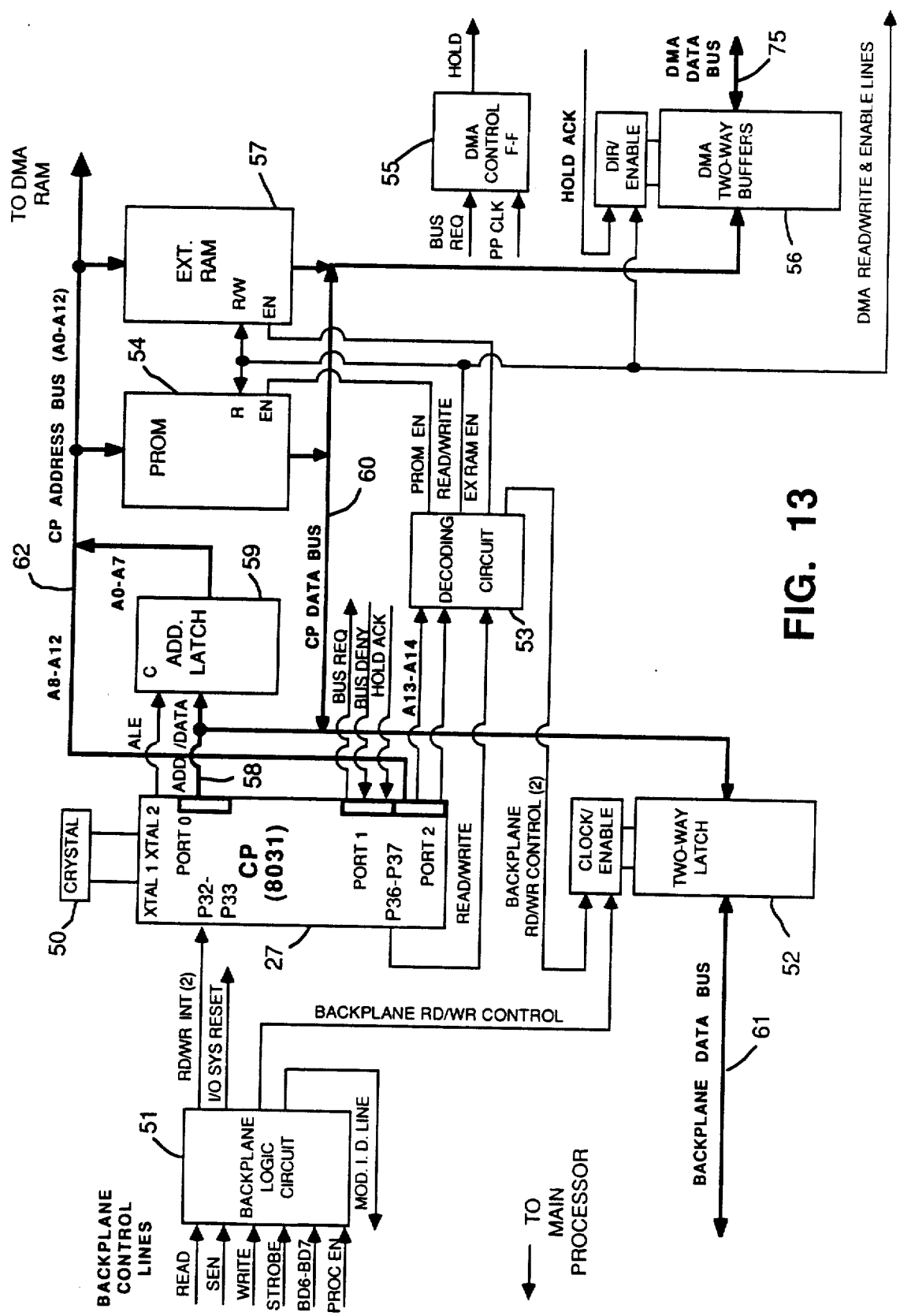
FIG. 13 is a schematic diagram of a backplane communication section of a processor circuit board incorporated in the I/O logic module of FIGS. 1 and 2.

FIGS. 13-17 show the details of the circuitry discussed earlier in relation to FIG. 2. In particular FIG. 13 shows the details of the backplane communication section 26 of the processor board 24 in FIG. 2. The communications processor (CP) 27 is preferably a Model 8031 microcomputer manufactured by Intel Corporation, Santa Clara, California. For information on the architecture, operation and programming of this circuit, reference is made to the commercial literature for this circuit which is available from Intel Corporation and its distributors. For a listing of other circuitry mentioned in this description, reference is made to Appendix A.

In this embodiment, a crystal 50 is connected to the XTAL 1 and XTAL 2 inputs to provide a clock frequency of 12 Mhz for operation of the processor 27. The processor 27 has I/O PORTS 0-3. I/O PORT 0 provides multiplexed outputs so that eight bits of data (D0-D7) and a lower eight bits of address (A0-A7) can be transmitted over a single eight-bit multiplexed bus 58 having lines (AD0-AD7). I/O port 2 provides the upper eight bits of address (A8-A15). The functions of the terminals in I/O PORT 1 and I/O PORT 3 that are used are given in TABLE 1 below.

TABLE 1

| | DEFINITION OF I/O PORTS 1 AND 3 | |
|---|---|---|
| PIN | IN/OUT | FUNCTION |
| P10 | I | 1 = I/O RESET |
| P11 | O | 0 = DMA BUS REQUEST |
| P12 | I | 0 = BUS REQUEST GRANTED |
| P13 | I | 1 = WATCHDOG TIME OUT |
| P14 | I | 0 = BUS DENY |
| P15 | O | 1 = COMMUNICATION FAULT |
| P16 | O | 0 = ENABLE MOD ID LINE |
| P32 | O | 0 = READ B.T. INTERRUPT |
| P33 | O | 0 = WRITE B.T. INTERRUPT |
| P36 | O | 0 = MEMORY READ |
| P37 | O | 0 = MEMORY WRITE |

The processor 27 utilizes certain backplane interface circuitry to read and write bytes of data to and from the main processor unit 10 using the block transfer techniques mentioned earlier herein. A backplane logic circuit 51 receives control signals from a known set of backplane control lines carrying READ, WRITE, SEN (SLOT ENABLE) and STROBE signals from the main processor unit 10. The backplane logic circuit 51 combines these signals and signals received on lines BD6 and BD7 of a BACKPLANE DATA BUS 61 to generate read and write interrupt signals to inputs P32 and P33 on the processor 27 and to generate a MOD ID signal that is returned to the main processor unit 10 to identify the I/O logic module as a module capable of executing the block transfer protocol.

The processor reads and writes bytes of data and control information through a two-way backplane 52 latch coupling the multiplexed bus 58 to eight lines (BD0-BD7) of the BACKPLANE DATA BUS 61. The latch 52 is enabled and the direction of data transfer is controlled by signals from the backplane logic circuit 51 and by control signals from the processor 27 which are coupled through a decoding circuit 53.

The processor 27 communicates data with the main processor unit 10 and performs other functions by executing a program of machine-language instructions which are stored in a programmable read-only memory (PROM) 54 with a capacity of 4k bytes of information. The communications processor 27 also communicates data with the program processor 29 utilizing a DMA control flip-flop 55 and a set of two-way DMA buffers 56 to execute a type of DMA (direct memory access). The processor 27 stores data that it is being communicated with the main processor unit 10 and with the program processor 29 in an external RAM 57 (random access memory) with a capacity of 2k bytes of information. The processor 27 also has 128 bytes of internal RAM for use as working registers.

The communications processor 27 addresses the internal RAM at addresses 0000H to 007FH, the PROM at addresses from 0000H to 1FFFH, the external RAM at addresses from 2000H to 3FFFH, a DMA RAM at addresses from 4000H to 5FFFH and the backplane latch at address 6000H, where "H" means a hexadecimal number. The address space of the internal RAM and the PROM 54 overlap, however, addresses can be distinguished by executing different instructions which generate additional control signals to apply the address to the proper memory.

To address the PROM 54 and the RAM 57 the multiplexed bus 58 is connected to address inputs on the PROM 54 and RAM 57 through an address latch 59. When address information is present on the multiplexed bus 58, the communications processor 27 transmits an address latch enable (ALE) signal to capture the address information in the latch 59, where it is held at the outputs as data is transmitted on the CP DATA BUS 60. In addition, address lines A8-A10 are connected to corresponding address inputs on the RAM 57 and address lines A8-A11 are connected to corresponding address inputs on the PROM 54 to provide the higher order bits of address. Lines A0-A12 of a CP ADDRESS BUS 62 are also connected to a DMA RAM 71 (FIG. 14) that is associated with the program processor 29.

The CP DATA BUS 60 connects the communications processor 27 to the PROM 54, to the RAM 57, to the backplane latch 52 and to DMA two-way buffers 56. Information can be sent in either direction on the CP DATA BUS 60, except that machine-language program information in the PROM 54 can only be read.

The communications processor 27 must also selectively enable various circuits to read and write information. To do this, its read and write control lines and two high order address lines A13 and A14 are connected as inputs to a decoding circuit 53 that generates read/write and enable signals. A signal on the PROM EN line activates the PROM 54 and a read signal on the READ/WRITE line will cause information to be read from the addressed location. Similarly, a signal on the EX RAM EN line activates the external RAM 57 and a read signal on the READ/WRITE line will cause information to be read from the addressed location of the RAM 57. A write signal on the READ/WRITE line will cause information to be written to the addressed location of the external RAM 57.

This has been a description of the circuitry in the backplane communication section except that the remaining description of the DMA circuitry will be discussed with the I/O programming and scanning section where the DMA RAM 71 is located.

Figure 14:
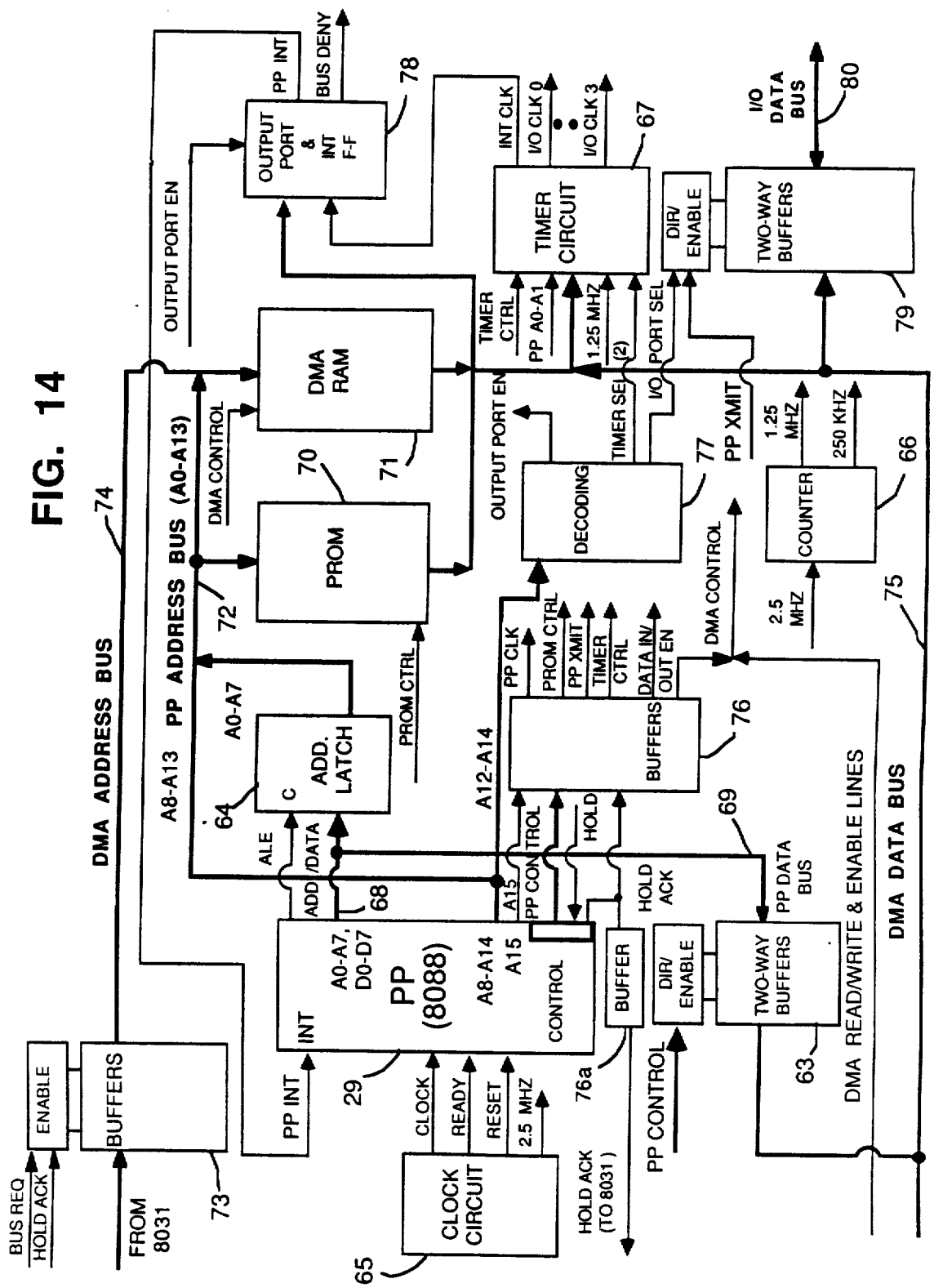
FIG. 14 is a schematic diagram of an I/O scanning and program section of the processor circuit board incorporated in the I/O logic module of FIGS. 1 and 2.

Referring next to FIG. 14, the program processor 29 controls the operation of the I/O programming and scanning section of the processor board. The program processor 29 is preferably a Model 8088 microprocessor manufactured by Intel Corporation of Santa Clara, California. This component is of the 16-bit processor class, having a 16-bit internal data path that can be interfaced to an 8-bit external data bus. By comparison the Model 8031 used as the communications processor is of the 8-bit class of microprocessors. The primary advantage of using a larger processor as the program and I/O scanning element is fast execution of the required logical computations. For information on the architecture, operation and programming of this circuit, reference is made to the commercial literature for this circuit which is available from Intel Corporation and its distributors.

The program processor 29 receives CLOCK signals at a frequency of 5 Mhz from a clock circuit 65. This circuit 65 also generates READY and RESET control signals and a 2.5 Mhz timing signal that is divided down by a counter circuit 66 to generate timing frequencies of 1.25 Mhz and 2.5 Khz. The 1.25 Mhz signal is coupled as an input to a timer circuit 67 for generating a 500-microsecond interrupt signal (INT CLK) and I/O CLK timing signals for certain circuits that filter signals seen at the inputs on the I/O logic module 15.

The program processor 2 has multiplexed outputs connected through a multiplexed (address and data) bus 68 to an address latch 64, When address information is present on the multiplexed bus, the program processor 29 transmits an address latch enable (ALE) signal to capture the address information in the latch 64, where it is held at the outputs as data is transmitted on the PP DATA BUS 69. In addition, address lines A8-A13 connect the program processor 29 to corresponding address inputs on the PROM 70 to provide the higher order bits of address and address lines A8-A12 are connected to corresponding address inputs the DMA RAM 71.

The PP ADDRESS BUS 72 connects to the DMA RAM 71 through a DMA address bus 74. The communications processor 27 can access the DMA RAM 71 through the a set of buffers 73 which couple the CP ADDRESS BUS 62 in FIG. 13 to the DMA ADDRESS BUS 74 in FIG. 14.

In analogous fashion, the PP DATA BUS 69 connects to the DMA RAM 71 though a set of two-way buffers 63 and a DMA DATA BUS 75. The program processor 29 controls the direction of data through these buffers with signals on the PP XMIT line in a PP CONTROL BUS. The program processor 29 gives up control of the DMA DATA BUS 75 by disabling the data buffers through an ENABLE line in the PP CONTROL BUS. The communications processor 27 has access to the DMA DATA BUS 75 through the two-way buffers 56 seen in FIG. 13.

The program processor 29 is connected through its highest order address line A15 and through a set of buffers 76 to enable the PROM 70 through a PROM CTRL line. Signals on lines A12-A14 are transmitted from the program processor 29 to a decoding circuit 77 where they are decoded to selectively activate other circuitry. Signals from the decoding circuit 77 enable an output port and interrupt flip-flop 78 through an OUTPUT PORT EN line. Signals from the decoding circuit 77 enable several of the timers in the timer circuit 67 through a pair of TIMER SELECT lines. I/O PORT SELECT signals from the decoding circuit 77 enable a set of two-way buffers 79 that form an I/O port for communicating I/O data with the I/O board 25. A DMA RAM SEL signal from the decoding circuit 77 selects and enables the DMA RAM 71.

A memory map for the program processor 29 is provided by TABLE 2 below.

TABLE 2

| MEMORY MAP FOR PROGRAM PROCESSOR | |
|---|---|
| ADDRESS RANGE (HEX) | FUNCTION |
| 0000-1FFF | RAM |
| 2000-3FFF | OUTPUT STATUS PORT |
| 3000-3FFF | PORT TO I/O BOARD |
| 4000-4FFF | 500 uSEC INTERRUPT RESET |

TABLE 2-continued

| MEMORY MAP FOR PROGRAM PROCESSOR | |
|---|---|
| ADDRESS RANGE (HEX) | FUNCTION |
| 5000-5FFF | 500 uSEC TIMER |
| 6000-6FFF | WATCHDOG TIMER |
| 7000-7FFF | UNUSED |
| 8000-BFFF | PROM |

The program processor 29 also generates a number of control signals represented generally by the PP CONTROL BUS in FIG. 14. These include the WRITE, ACCESS I/O, ACCESS MEM, XMT, RCV, ENBL, READ INTRPT ACK, HLDA and GRANT signals. These are buffered and logically combined where necessary to produce the PP CLK, PP XMIT, TIMER CTRL, DATA IN ENABLE and DATA OUT ENABLE lines. The PP CLK signal is used in the DMA transfer of data. The PP XMIT signal controls the direction of transfer through the I/O port buffers 79. The TIMER CTRL lines carry read, write and chip select signals to the programmable timer circuit 67. The DATA IN ENABLE and the DATA OUT ENABLE lines extend to the I/O board 25 to control the transfer of data between the processor board 24 and I/O board 25.

The communications processor 27 in FIG. 13 communicates with the program processor 29 by DMA transfer of data between its external RAM 57 and the DMA RAM 71. The communications processor 27 initiates the cycles for reading data from the DMA RAM 71 and for writing data to the DMA RAM 71 by generating a BUS REQUEST signal from Pin P11 in I/O PORT 1. This signal is latched in the DMA control flip-flop 55 when it is clocked by the PP CLK signal from the program processor 29. As a result, a HOLD signal is transmitted from the output of the DMA control flip-flop 55 to a HOLD input on the program processor 29 as a signal that it should relinquish control of its address and data buses. The program processor 29 signals its release of the buses by generating a HOLD ACK signal, which is transmitted through a buffer 76a to Pin P12 in I/O PORT 1 on the communications processor 27. The HOLD ACK signal is also transmitted to respective enable inputs on the address buffers 73 in FIG. 14 and to the two-way data buffers 56 in FIG. 13. These buffers 73, 56 couple the CP ADDRESS BUS 62 and the CP DATA BUS 60 to the DMA ADDRESS BUS 74 and DMA DATA BUS 75, and when these buffers 73, 56 are enabled, the communications processor 27 can read data and write data in the DMA RAM 71.

Control of the DMA address and data buses 74, 75 is retained by the program processor 29 until it finishes executing one of the particular programmed sequences that is executed within a timed interrupt period that occurs every 500 microseconds. Interrupt signals to the program processor 29 are generated on a PP INT line every 500 microseconds. One of the timers in the timer circuit 67 is initialized to time out every 500 microseconds, and when it does, it transmits an INT CLK signal that is latched in an interrupt status flip-flop 78 to generate the PP INT signal. During the timed interrupt period, the interrupt status flip-flop 78 generates a BUS DENY signal from a second output to the communications processor 27. When the interrupt period is completed, the interrupt status flip-flop 78 is reset and the PP INT and BUS DENY signals change to their logic inactive state. With the BUS DENY signal inactive, the communications processor 27 can gain control of the DMA buses 74, 75 through the CP BUS REQUEST and the HOLD ACKNOWLEDGE signals.

The HOLD ACK signal also controls which of the processors 27 or 29 controls the DMA CONTROL lines. These lines include read, write and chip select lines for reading and writing information in the DMA RAM 71. The DMA HOLD ACK signal is used to enable and disable the buffers 76 which couple these signals from the program processor 29 to the DMA CONTROL lines. When the buffers 76 are disabled, the communications processor 27 controls these lines.

The communications processor 27 will only control the DMA buses for time sufficient to transfer one byte of information per DMA cycle. During DMA transfer cycles, the communications processor 27 disables interrupt signals from the backplane.

F. I/O Logic Module Circuitry - The I/O Board

Figure 15:
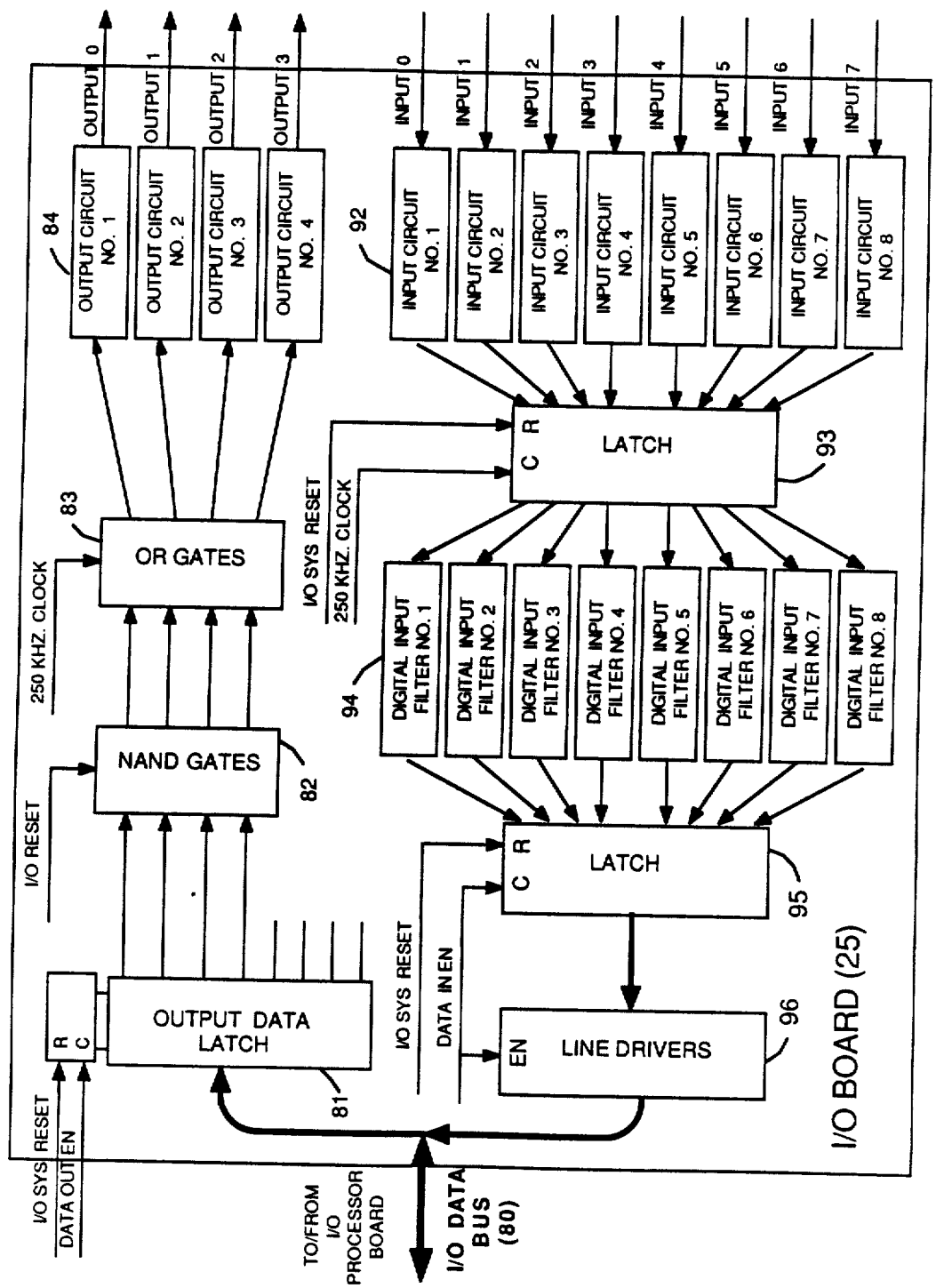
FIG. 15 is a schematic diagram of an I/O circuit board of the I/O logic module of FIGS. 1 and 2.

FIG. 15 shows the programmable controller system outputs (OUTPUT 0 - OUTPUT 3) and system inputs (INPUT 0 -INPUT 3) for interfacing the programmable controller system to the machine or process 17 (FIG. 1) being controlled through I/O devices 16 (FIG. 1). These system outputs and inputs will sometimes be referred to as "machine interface" inputs and "machine interface" outputs to distinguish them from the many electronic inputs and outputs which are internal to the programmable controller system or which perform functions such as communication between different portions or modules of the programmable controller system.

FIG. 15 shows the I/O board 25 with four single-bit DC outputs (OUTPUT 0–OUTPUT 3) and with its eight single-bit DC inputs (INPUT 0–INPUT 7). Data is transmitted from the processor board 24 to the outputs through an eight-bit I/O data bus 80 which connects the two-way buffers 79 in FIG. 14 to an eight-bit output data latch 81. This latch 81 is clocked through a DATA OUT EN line that is controlled by the program processor 29 as seen in FIG. 14. The latch is reset or cleared through an I/O SYSTEM RESET line which is controlled by PROC EN and power signals received from the backplane through the backplane logic circuit 51.

Four outputs on the latch 81 are connected through two sets of gates 82, 83 and four output circuits 84 (OUTPUT CIRCUIT NOS. 1–4) to OUTPUTS 0–3. A set of NAND gates 82 controls the enabling and disabling of outputs through the I/O RESET line. A set of OR gates 83 are essentially driver circuits with timing of output signals controlled by a 250 Khz signal from the counter circuit 66 in FIG. 14.

FIG. 16 shows the details of OUTPUT CIRCUIT 0, and the other outputs circuits are of the same configuration. A data signal, in this case for the low order bit DATA 0, is coupled to a one side of an isolation transformer 85 that provides physical and electrical isolation between the electronics in the I/O logic module 15 and the machinery or process equipment being controlled. A fuse circuit 86 is also connected on this side of the transformer to detect an overcurrent condition. The opposite side of the transformer is connected through a diode 87, a shunt resistor 88 and a shunt capacitor 84 to a power FET 90 which switches the output ON and OFF. An output supply voltage is applied to the drain of the FET 90 and the source is connected to OUTPUT 0, which is held above ground potential by a diode 91. When a signal is applied through the isolation transformer to the gate of the FET 90, the FET 90 will switch on to apply the supply voltage to OUTPUT 0. The voltage supply line is fused and a fuse blown signal is provide as shown.

Returning to FIG. 15, data is transmitted from INPUTS 0–7 to the processor board through the: eight-bit I/O DATA BUS 80. INPUTS 0–7 are connected through input circuits 92 to a first eight-bit latch 93. The latch 93 is clocked by the 250 Khz timing signal from the processor board 24 and the latch 93 is reset through the I/O SYSTEM RESET line. The outputs of this latch 93 are connected to a set cf digital input filters 94 which are programmed to sense inputs signals over selected time periods. The outputs of DIGITAL INPUT FILTER NOS. 1–8 are connected to the inputs on a second eight-bit latch 95, and the outputs of this latch 95 are coupled to the I/O DATA BUS 80 through an eight-bit set of line drivers 96. When an input signal has been loaded into the latch 95, a signal from the processor board on the DATA IN ENABLE line will couple data from the outputs of the latch 95 to the I/O DATA BUS 80 and will also load new data into the latch 93. The latch 93 is reset through the I/O SYSTEM RESET line.

FIG. 17 shows the details of INPUT CIRCUIT 0, and the other input circuits 92 are of the same configuration. A signal on the INPUT 0 line is coupled through a rectifying diode 97 to one side of an opto-coupler circuit 98 that provides a physical and electrical isolation interface between the controlled equipment and the controller electronics. An output on the opto-coupler circuit is connected through line filtering components 99 and a driver circuit 100 to the low order input (D0) on the latch in FIG. 15.

Figure 18:
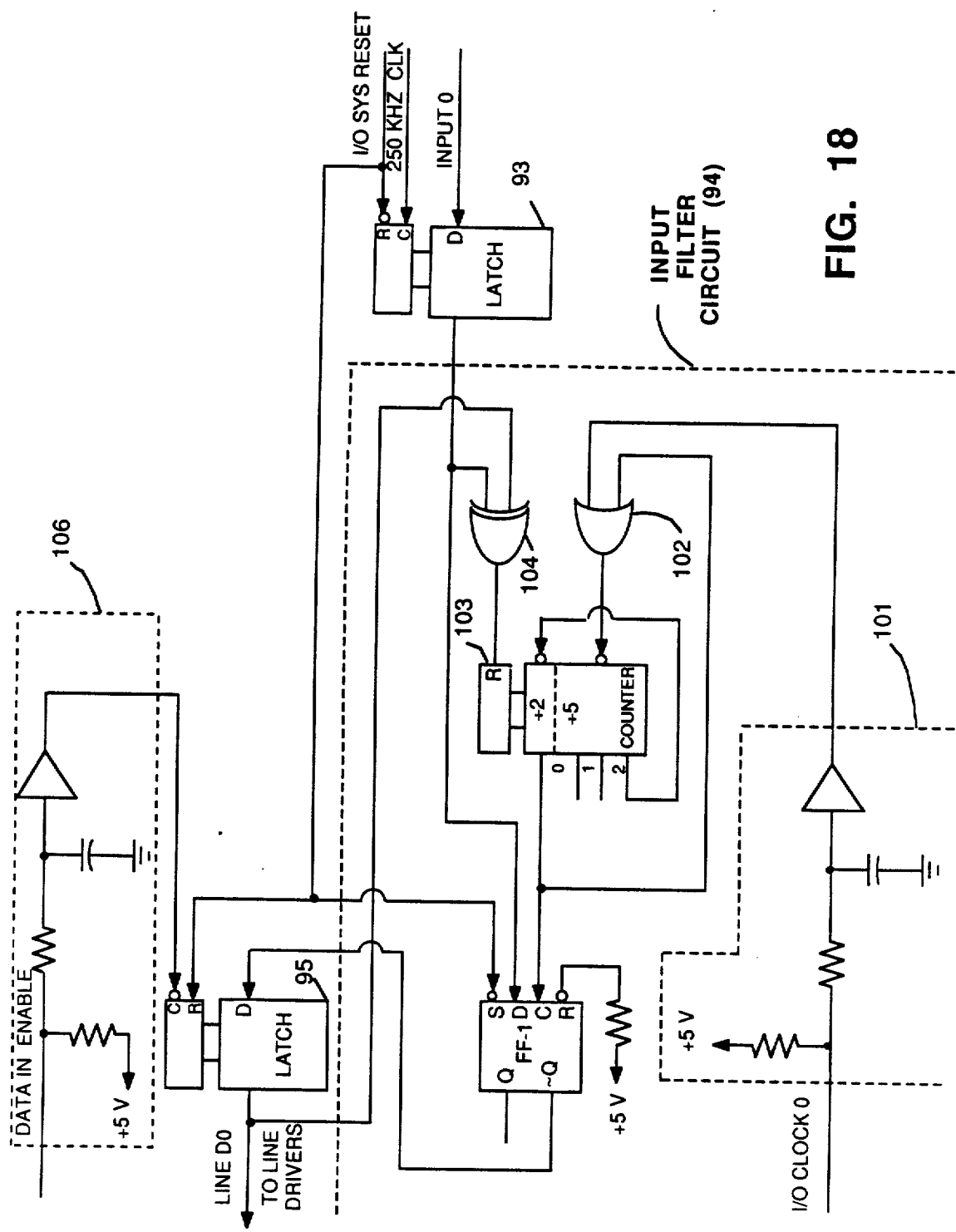
FIG. 18 is a detail schematic of one of the digital input filter circuits seen in FIG. 15.

FIG. 18 shows the details of DIGITAL INPUT FILTER NO. 1, and the other digital input circuits 94 are of the same configuration. For clarity of the explanation, the latches 93 and 95 are also shown in FIG. 18. The DATA IN ENABLE signal to the latch 95, and the I/O SYSTEM RESET signal and the 250 Khz CLOCK signal to the latch 93 have been described previously in relation to FIG. 15. The I/O CLOCK 0 signal originates at the outputs of the timers 67 in FIG. 14 and is received through a signal conditioning circuit 101 in FIG. 18. ( Each of the I/O CLOCK signals in FIG. 14 serves two inputs, so I/O CLOCK 0 would also control the input filter circuit for INPUT 1.)

The I/O CLOCK 0 signal is a sampling signal and its time period (from 10 microseconds to 9.999 milliseconds) determines how long the INPUT 0 signal must be present for detection. As seen in FIG. 18, the sampling signal is coupled through an OR gate 102 to a clock input on a divide-by-5 portion of a two-stage counter 103. The "count 2" output of this stage is connected to the clock input of a divide-by-2 stage with the result that five clock pulses to the clock input on the first stage will produce one clock pulse to the clock input on a flip-flop FF-1. The state of the output on the flip-flop FF-1 is controlled by the state of the signal at its D input, and this signal is received from the output on the latch 93 for the selected bit of data. The output of the flip-flop FF-1 will change state when the data at the D input has been present for five sampling periods at the selected I/O CLOCK 0 signal frequency. When the ~Q output of the flip-flop FF-1 changes state, the signal will be transmitted to the D input on the latch 95, provided that latch 95 is enabled, and the signal will appear at a Q output of the latch 95 for transmission to the processor board 24. If the data at the D input of the latch 93 changes state due to a change in the INPUT 0 signal, the counter is reset through an exclusive-OR gate 104, which detects any difference in the last state of the data in the latch 95 in comparison to the present state on the INPUT 0 data. Thus, if the period of the sampling signal is 10 microseconds, the INPUT 0 data must be present for 50 microseconds to be seen at the output of the latch 95.

This completes the description of the circuitry on the I/O board 25. It should now be understood how input status data and output status data are coupled between the processor board 24 and INPUTS 0–7 and OUTPUTS 0–3. The input circuitry on the I/O board 25 will accept DC voltages in the range from 0–4 volts as logic "0" data and will accept DC voltages in the range from 10–24 volts as logic "1" data. The inputs are current sinking The output circuitry will switch voltages from 5–24 DC volts and will provide a 2-amp current source per output.

G. Machine-Language Programming of the Communications Processor

This section will provide a description of the organization of the machine-language program that is stored in the PROM 54 in FIG. 13. This program is executed by the communications processor 27 to perform its various functions including: (1) communication with the main processor unit via block transfer operations, and (2) communication with the program processor 29 by transferring data to and from the DMA RAM. The routines for the machine-language program are contained in an assembler listing in Appendix B which is incorporated in this specification. This description is intended as a guide to that listing, as the listing is understood by those skilled in the art and is the most definitive description of the machine-language program.

Figure 19:
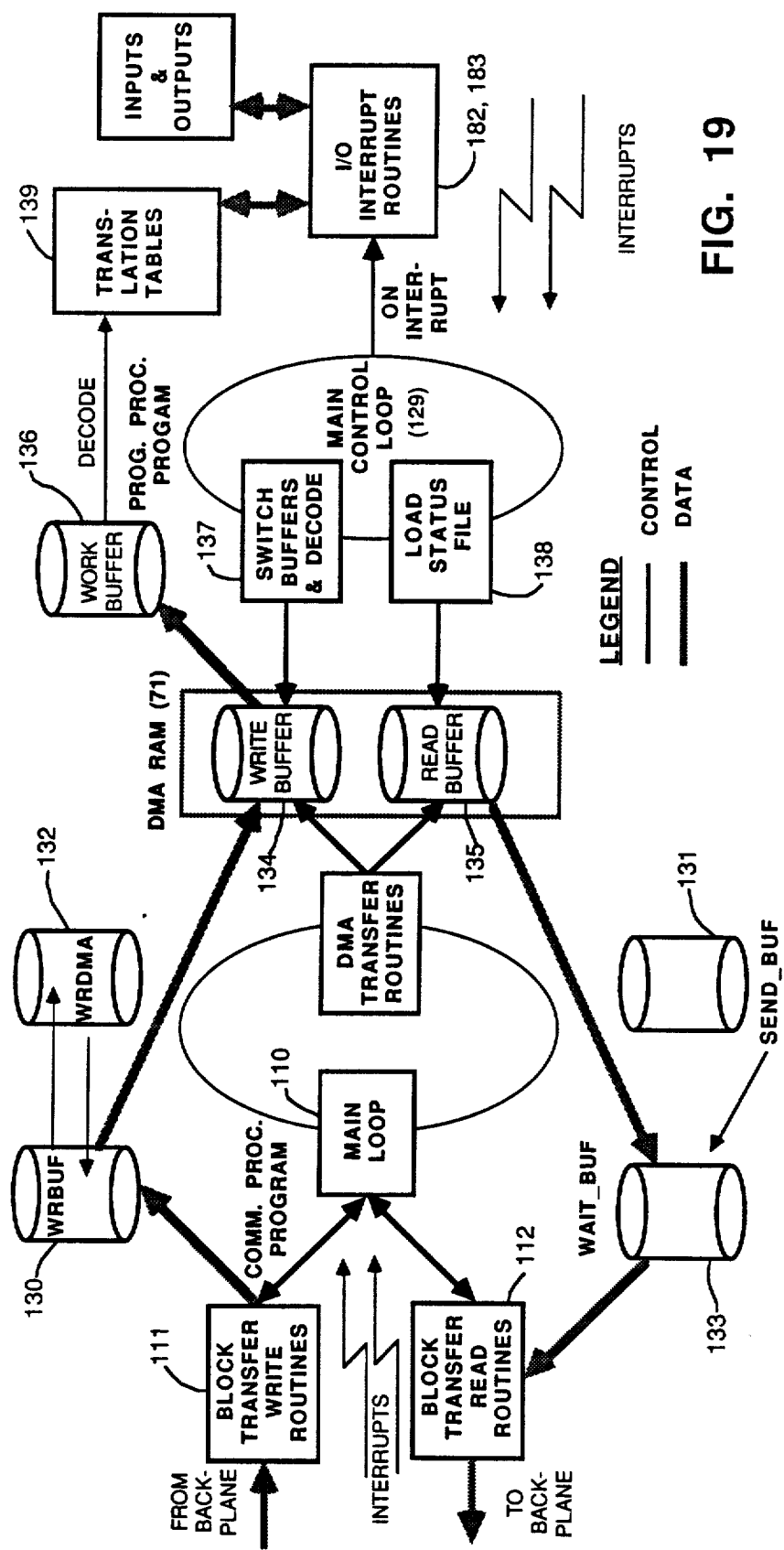
FIG. 19 is a diagram showing the organization of the machine-language programs executed by the I/O logic module to receive, translate and execute the downloaded user program.

As seen in FIG. 19, the communications processor 27 executes a MAIN LOOP routine 110 and associated subroutines as background routines. These routines are interrupted—to execute block transfer write routines 111 and to execute block transfer read routines 112. The term "write", as used in referring to block transfer write operations, relates to the direction of communication from the main processor unit 10 to the I/O logic module 15. The term "read", as used in referring to block read operations, relates to the direction of communication from the I/O logic module 15 to the main processor unit 10.

Figure 21:
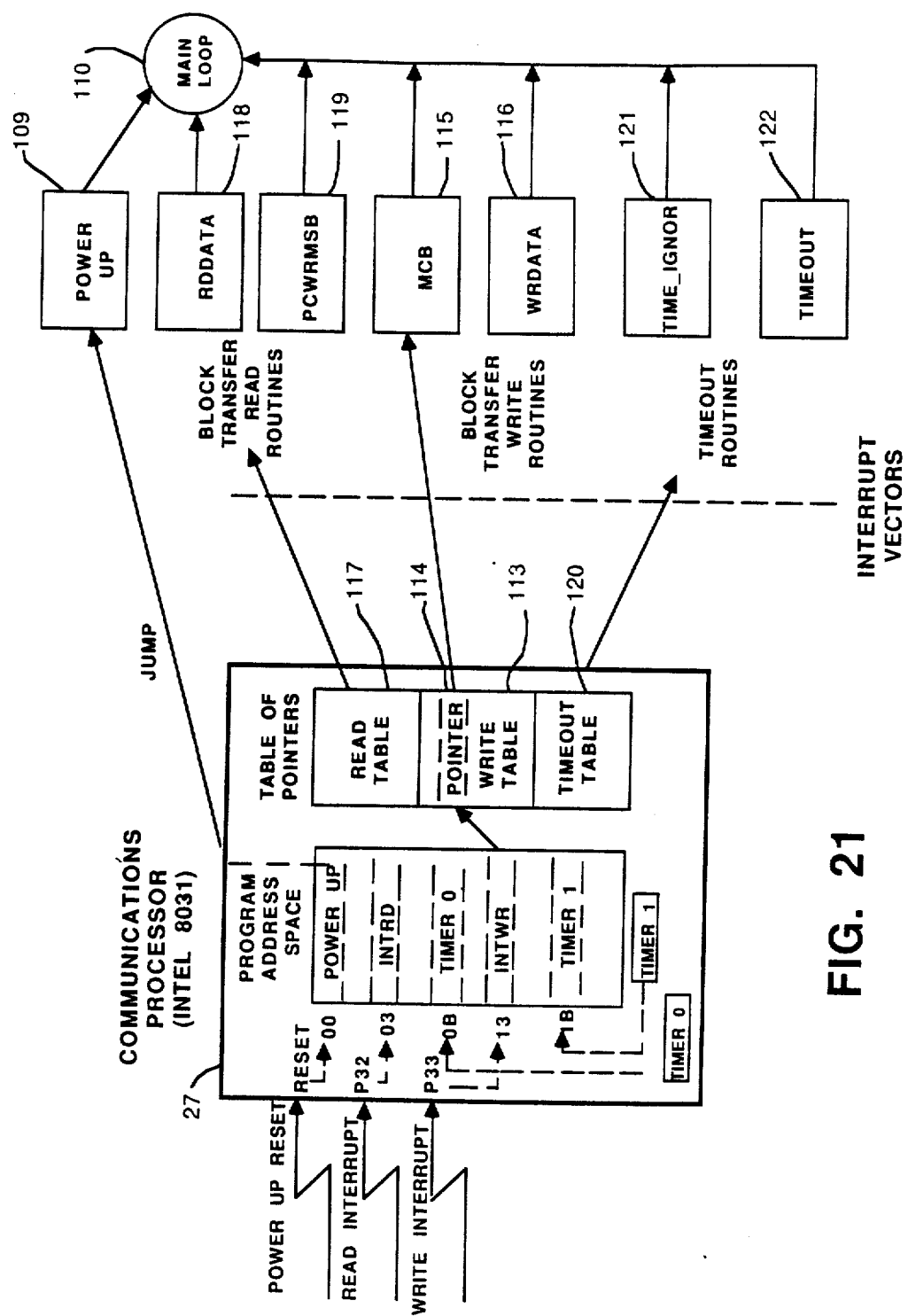
FIG. 21 is an interrupt vector diagram showing the execution of the block transfer routines represented in FIG. 19.

As illustrated in FIG. 21, the block transfer interrupt signals are received at inputs P32–P33, and depending upon which input receives the interrupt signal, the communications processor 27 will "vector" to a corresponding interrupt routine, to communicate data through the backplane. The MAIN LOOP routine is also interrupted by two internal timer interrupt signals.

As seen in FIG. 21, there are five interrupt vector routines stored in the lowest address space in the PROM. These are short routines of one to three instructions. A POWER UP vector instruction is stored at location 00 (hex), a BLOCK TRANSFER READ (INTRD) vector routine is stored at location 03 (hex), a BLOCK TRANSFER WRITE (INTWR) vector routine is stored at 13 (hex), a TIMER 0 vector routine is stored at location 0B (hex), and a TIMER 1 vector routine is stored at 1B (hex). The TIMER 0 interrupt occurs in response to a 360-microsecond timeout during block transfer communications, while the TIMER 1 interrupt controls the "on time" of a communication fault LED (not shown).

Considering the POWER ON interrupt first, a single JUMP instruction is executed in response to the POWER ON signal to jump to a first routine 109 (POWER UP) in the machine-language program in the PROM. Similarly, the TIMER 1 vector routine is a single jump instruction to an interrupt routine (not shown). The other three short interrupt routines form an address in a table of pointers.

The BLOCK TRANSFER WRITE (INTWR) vector routine comprises three instructions which, when executed, form an interrupt vector address, by adding an interrupt control byte (ICB) to a preselected base address (INTWR), to select a particular location within the INTWR table 113. The contents of the location in the INTWR table provide an address pointer 114 to the first address of a selected one of the INTWR routines 115, 116. The ICB can be changed during execution of the machine-language program, so that for successive INTWR signals, various routines can be executed by selecting different pointers in the INTWR table 114. Similarly, the BLOCK TRANSFER READ(INTRD) vector routine comprises three instructions which, when executed, form an interrupt vector address in a READ table of pointers 117 to the various INTRD routines 118, 119. The TIMER 0 vector routine comprises three instructions which, when executed, form an interrupt vector address in a TIMEOUT table of pointers 120 to various TIMEOUT routines 121, 122.

The INTWR routines 115, 116 include an MCB routine 115 for reading a first byte of information from the backplane latch. In either a write block transfer or a read block transfer, this byte will be a module control byte (MCB) with read and write flags and a binary-coded number of words in the file being transferred. Based on whether a "read" flag or a "write" flag is detected, an INTRD routine 119 or a PCRDMSB (not shown) will be executed.

During execution of the MCB routine 115 the ICB will be changed so that, on the next INTRD signal, either the PCRDMSB routine or a PCWRMSB routine will be executed, to load the backplane latch 52 (FIG. 13) with an appropriate module status byte (MSB), which is sent back to the main processor unit 10 to acknowledge receipt and processing of the MCB. If a "read" block transfer is being executed, the PCRDMSB routine (not shown in FIG. 21) will set the ICB, so that on the next INTRD signal, an INTRD routine 118 referred to as RDDATA will be executed to load a byte of status file data into the backplane latch 52. If a "write" block transfer is being executed, the PCWRMSB routine 119 will set the ICB, so that on the next INTWR signal, an INTWR routine 116 referred to as WRDATA will be executed to read a byte of program file data from the backplane latch.

Successive interrupts will cause the bytes of data in the program file 20 or the status file 21 to be transferred between the backplane latch 52 and various buffers in the external RAM 57. As shown in FIG. 19, block transfer "write" data is eventually stored in a buffer labeled "WRBUF", while block transfer "read" data is stored in a buffer 131 labeled "SEND_BUF" before being sent to the main processor unit 10. The communications processor 27 uses two buffers for transferring data in each direction, so that one buffer in each direction is accessible by the routines for communicating with the main processor unit 10 and another buffer in each direction is available for communicating with the program processor 29.

Instead of moving data from WAIT_BUF to SEND_BUF or from WRBUF to WRDMA, the communications processor 27 switches the identity of the buffers by changing the memory address in address pointer locations in its internal RAM labeled WAIT_BUF, SEND_BUF, WRBUF and WRDMA. The actual buffer areas 130, 132 used for WRBUF and WRDMA in the external RAM are located at addresses 2000-20FF (hex) and 2100-21FF (hex). The buffer areas 131, 133 used for WAIT_BUF and SEND_BUF in the external RAM 57 are located at addresses 2600-26FF (hex) and 2700-27FF (hex).

Further interrupts in the write block transfer operation cause a checksum to be received for the write data and compared to a checksum that is computed from the write data to assure the data has been correctly communicated. Further interrupts in the read block transfer operation cause a checksum to be loaded into the backplane latch 52 for communication to the main processor unit 10.

Referring to FIG. 19, the communications processor 27 communicates data with the program processor 29 by transferring data to and from the DMA RAM 71. This is accomplished by executing the MAIN LOOP routines represented in FIG. 19 and listed in Appendix B. In executing these routines, the communications processor 27 will move "write" data or program file data from the WRDMA buffer 132 to a WRITE buffer 134 in the DMA RAM 71. "Read" data or status file data will be moved from a READ buffer 135 in the DMA RAM 71 to the buffer labeled WAIT_BUF in FIG. 19. To assure that data is moved to a proper buffer area in memory before more data is transferred, the communications processor 27 and the program processor 29 utilize semaphore bytes which are stored in locations in the DMA RAM. A VALID_WR semaphore byte contains a flag bit and a binary-coded number of bytes to be transferred to a WORK BUFFER 136 accessible by the program processor 29. A VALID_RD semaphore byte contains a flag bit and a binary-coded number of bytes to be transferred to the buffer 133 labeled WAIT_BUF, and eventually to the main processor unit 10.

Figure 20:
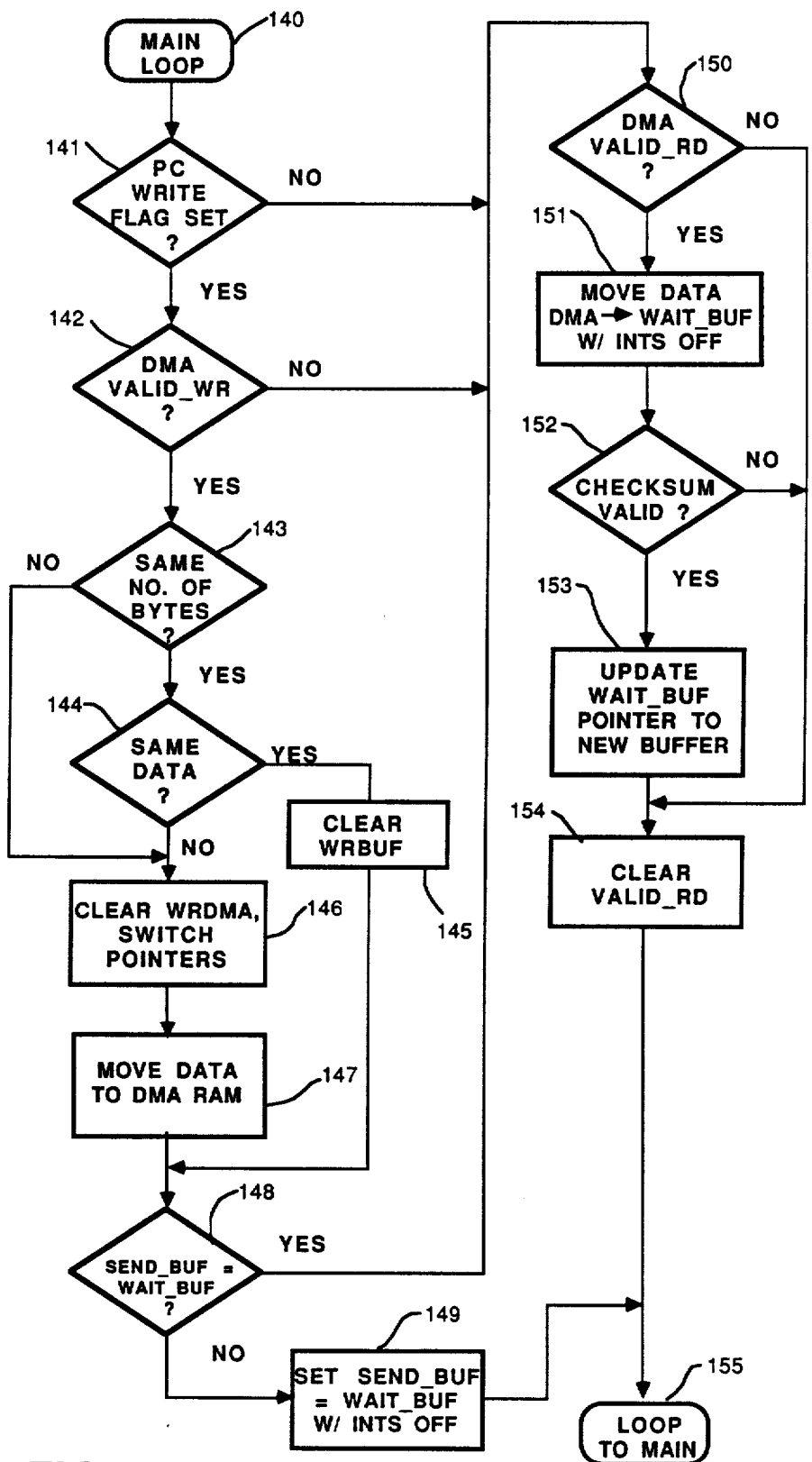
FIG. 20 is a flow chart of the MAIN LOOP and DMA TRANSFER routines executed by the communications processor as represented in FIG. 19.

The MAIN LOOP, which includes the DMA TRANSFER ROUTINES, is entered after certain power up and initialization routines in Appendix B have been executed. Referring now to FIG. 20, the beginning of the MAIN LOOP is represented by start block 140. As represented by decision block 141, a flag is checked to see if new data has been received from the PC (main processor unit 10). If the answer is "NO", then the routine skips to the READ sequence beginning in block 150. If the answer is "YES", then the VALID_WR byte is read from the DMA RAM and compared to zero. If the VALID_WR byte is not zero, represented by the "NO" result, then the last "write" data sent to the program processor 29 has not been read, and the routine skips to the READ sequence beginning in block 150. If the VALID_WR byte is zero, represented by the "YES" result, then the last "write" data sent to the program processor 29 has been read, and a new transfer can take place.

The communications processor 27 then checks to see whether the data about to be transferred to the DMA RAM is different from the data last placed in the DMA RAM. As represented by decision block 143, it compares the number of bytes to be sent with the number of bytes in the DMA RAM as indicated by the VALID_WR semaphore byte. If this is not the same number, as represented by the "NO" result, it is assumed the data is new data and the program skips to the READ sequence beginning in block 150. If it is the number of bytes is the same, as represented by the "YES" result, the data is then compared byte-by-byte, as represented by decision block 144, to see if it is the same data as previously sent. If this is the case, as represented by the "YES" result, the data is cleared from the buffer labeled WRBUF, as represented by process block 145, to allow new data to be received from the main processor unit 10 and the program proceeds to the portion of the program beginning in block 148.

Assuming that new data is present in the buffer labeled WRBUF, as represented by the "NO" result branching from decision block 144, the communications processor 27 executes instructions represented by block 146, to switch a buffer pointer labeled WRDMA to point to the buffer 130 with the program file data. The communications processor 27 clears the other "write" data buffer 132, which becomes the WRBUF for receiving data through the backplane. This swapping of buffer identities is illustrated in FIG. 19.

As represented in FIG. 20 by process block 147, the communications processor 27 executes a DMA transfer cycle 147—only one byte of data is transferred in each cycle. In each cycle, the communications processor 27 executes instructions to test the BUS DENY line in FIG. 13 to determine whether the program processor 29 is in its background routine or in an interrupt routine for real-time control of equipment. Assuming the BUS DENY signal is not detected, the communications processor 27 must first disable its interrupts, so that backplane transfers will not interrupt the DMA transfer. The communications processor 27 then executes an output instruction to generate the BUS REQUEST signal and an instruction to detect the HOLD ACK signal from the program processor 29. It then transfers the byte of data, removes the BUS REQUEST signal, and re-enables the backplane interrupt inputs.

After the write DMA transfer, the communications processor 27 executes instructions represented by decision block 148 to see whether the pointers to the SEND_BUF and the WAIT_BUF are the same. If the result is "NO", it means that the last data placed in WAIT_BUF buffer for transfer back to the main processor unit 10 has not been taken. It also means that an empty buffer is not available to receive more data from the program processor 29. With the backplane interrupts turned off, the communications processor 27 then switches the SEND_BUF to the same address as the WAIT_BUF pointer, so that data will be transferred from the buffer to the backplane. The communications processor 27 then loops back to the beginning of the MAIN LOOP as represented by end block 155.

Returning to decision block 148, if the SEND_BUF pointer and the WAIT_BUF pointer are the same, as represented by the "YES" result, the program proceeds to the DMA READ sequence beginning in block 150. As represented there, the VALID_RD semaphore byte is read from the DMA RAM and a test is made for the read flag bit. If the result is negative, the communications processor 27 skips to block 154 near the end of the MAIN LOOP. If the result is positive, as represented by the "YES" branch, then the communications processor 27 executes a read DMA cycle represented by process block 151 to transfer one byte of data to one of the buffers 131, 133 with the backplane interrupt inputs turned off. The read DMA data is loaded into the empty buffer while the SEND_BUF and WAIT_BUF pointers are pointing to the other buffer. As represented by decision block 152, the communications processor 27 then computes a checksum for the data received in the buffer in the buffer 131, 133 and compares it to a checksum read from the DMA RAM. According to the result, the data is determined to be valid or invalid. If invalid, as represented by the "NO" branch from decision block 152, the communications processor 27 skips to block 154 near the end of the MAIN LOOP. If valid, as represented by the "YES" branch from decision block 152, then the new buffer that received the data becomes the WAIT_BUF by updating the WAIT_BUF pointer as represented by process block 153. The VALID_RD flag is then cleared as represented by process block 154, until the program processor 29 puts new data in the DMA RAM buffer.

Referring back to FIG. 19, it should now be understood how the MAIN LOOP is executed to transfer data to and from the DMA RAM 71 and how data is transferred to the backplane by interrupting this MAIN LOOP portion of the machine-language program.

Machine-Language Programming of the Program Processor

This section will provide a description of the organization of the machine-language program that is stored in the PROM 70 in FIG. 14. This program is executed by the program processor 29 to perform its various functions including: (1) communication with the communications processor 27, (2) translation of user programs downloaded from the main processor unit and (3) execution of the translated programs to control input and output devices on the controlled machine or process. The routines in the machine-language program are contained in an assembler listing in Appendix C which is incorporated in this specification. This description is intended as a guide to that listing, as such listing is understood by those skilled the art and is the most definitive description of the machine-language program.

The program processor 29 executes a MAIN routine and associated subroutines as background routines. As seen in FIG. 19, the MAIN routines include a MAIN CONTROL LOOP portion 129, a SWITCH BUFFERS AND DECODE portion 137 and a LOAD STATUS FILE portion 138. The MAIN routines are interrupted every 500 microseconds in response to a timed interrupt signal that is received at an input on the program processor 27. There are various interrupt routines and the selection of one of then depends on the identity of an interrupt vector address that is loaded into an interrupt vector location in memory. By switching the interrupt vector the program processor 29 can prepare to enter a different interrupt routine on the next interrupt signal. Within the primary interrupt routines, the program processor 27 will call various subroutines to perform specialized functions.

Figure 22:
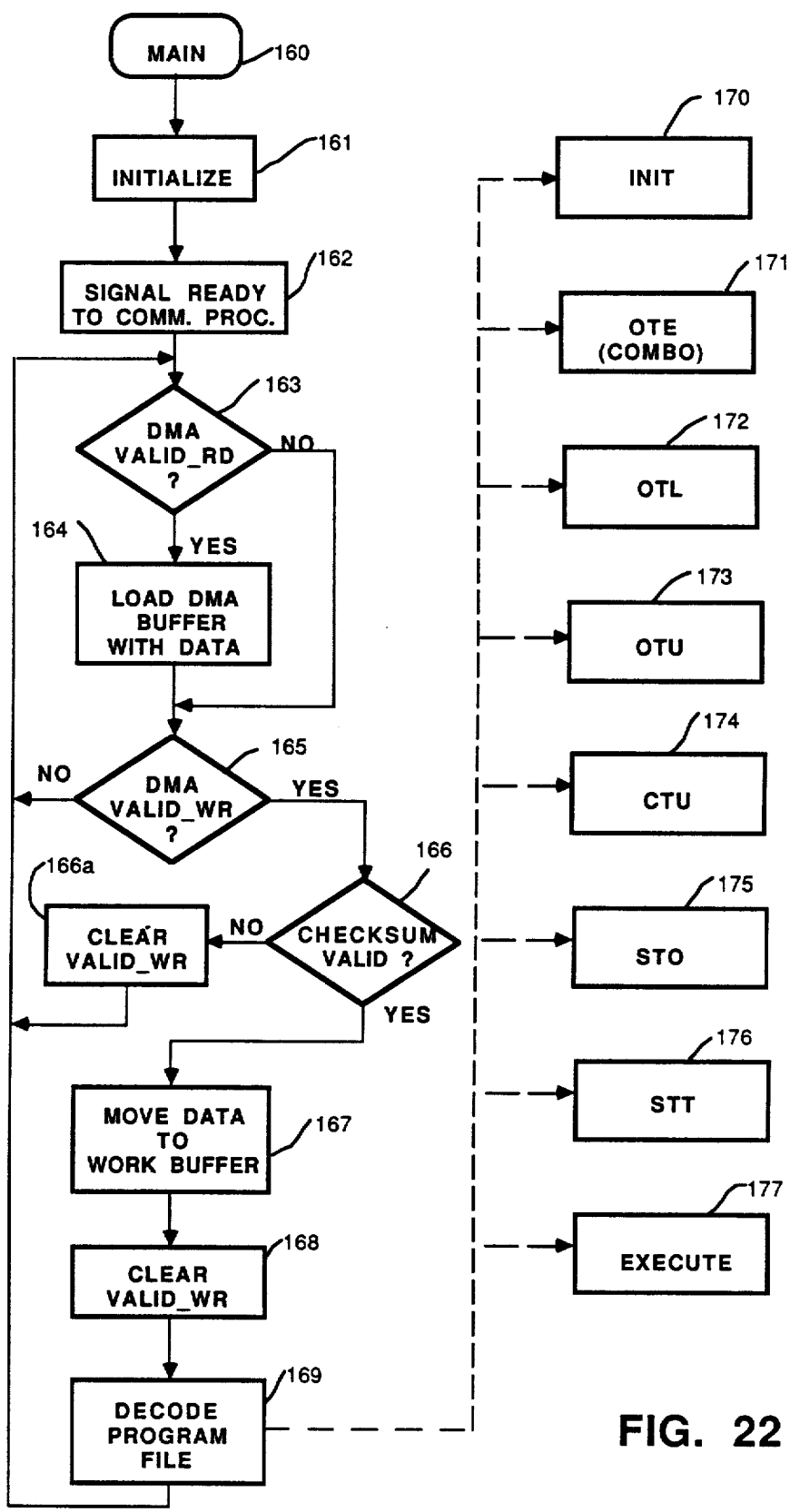
FIG. 22 is flow chart of the MAIN routine executed by the program processor as represented in FIG. 19.

FIG. 22 is a flow chart of the MAIN routine. After power on represented by start block 160, the program processor 29 executes an initialization subroutine represented by process block 161 to place initial values in various registers and memory locations, to perform diagnostic checks on memory circuits and to start up any external circuitry requiring initialization. The program processor 29 then executes a subroutine represented by process block 162, to place data in the DMA RAM 71 that will be read by the communications processor 27 as a signal that the program processor 29 has completed initialization and is ready for further communication.

The MAIN CONTROL LOOP begins with decision block 163 and loops back through block 165, 166 or 169. As represented by decision block 163, the program processor 29 executes a test instruction on a semaphore flag bit in memory location designated VALID_RD to determine whether the communications processor 27 has read a block of data in a DMA READ data buffer. If the result is "YES", the program processor 29 will load new data in the DMA read buffer 135 in FIG. 19. This operation is represented in FIG. 22 by process block 164 and in FIG. 19 by block 138, which shows that the new data is data for the status file 21.

If the result in block 163 is "NO", the program processor 29 will skip to decision block 165 and test a semaphore flag bit in a memory location designated VALID_WR to determine whether the communications processor 27 has written a block of data in a DMA write buffer 134. If the result in block 165 is "NO", the program processor 29 returns to block 163, to check the VALID_RD flag. If the result in block 165 is "YES", the program processor 29 computes and compares a checksum as represented by decision block 166, to confirm the validity of the data transfer. If this test result is positive, the data in the DMA write buffer 134 is moved to a WORK BUFFER area 136 (WRKWRBUF) in memory as represented by process block 167. Then, as represented by process block 168, the VALID_WR flag is cleared in anticipation of the next transfer form the communications processor 27. If the test result in block 166 is negative, the program processor 29 clears the VALID_WR flag, as represented by process block 166a, and returns to block 163 to check the VALID_RD flag. When the communications processor 27 finds that the VALID_WR flag has been cleared, it will know that a buffer is clear to receive a new block of write data.

The data that is being moved to the working buffer is the program file 20 that has been downloaded to the communications processor 27 from the main processor unit 10. After the data has been moved to the working buffer, a DECODE subroutine is called, as represented by process block 169, to set up the tables for executing the user control program. When a new program file has been received, the execution of the DECODE routine 169 may be interrupted many times before completion by the 500-microsecond interrupt routines. Assuming that the DECODE routine has been completed, the MAIN routine will loop back to check check the VALID_RD flag in decision block 163.

The DECODE routine 169 examines two-byte words in the user program file in the working buffer to determine which type of user program instruction (i.e., INIT, OTE, STO) is to be translated. The command operation codes for the respective instructions are maintained in a table that is related to a table of address vectors for the respective instruction decoding routines. When one of the commands is detected in execution of the DECODE routine 169, the corresponding vector data will be used to assemble a jump address to the beginning address in a routine to be executed to decode the particular user program instruction. Thus, there are further routines 170-177 corresponding to each of the instructions (i.e., INIT, OTE, STO) in the set of user program instructions discussed earlier.

Assuming that the first instruction in the program file is the INIT instruction, the program processor 29 will jump to an INIT translation routine. As mentioned above the DECODE routines will be interrupted by the 500-microsecond interrupt routines. To understand the effect of decoding the INIT instruction, it is helpful to mention the various types of interrupt routines here.

Figure 23:
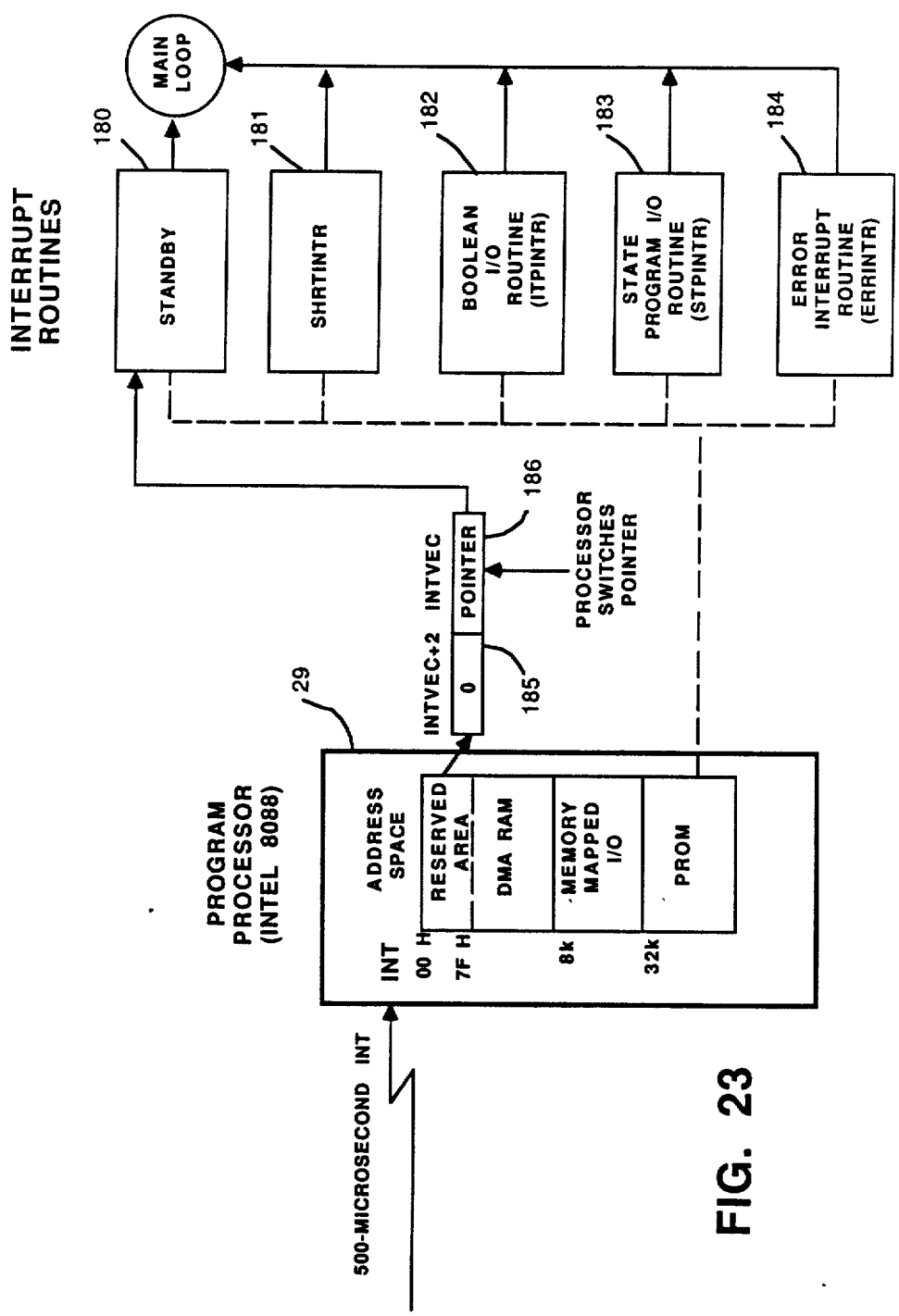
FIG. 23 is an interrupt vector diagram representing execution of the I/O interrupt routines shown in FIG. 19.

Referring to FIG. 23, block 180 represents a STANDBY interrupt routine in which input data is read, while the outputs are reset to an initial state such as "0000". The execution of this routine does not change the state of the outputs in response to the state of the inputs. Block 181 represents the SHORT interrupt routine (SHRTINTR) which is an abbreviated form of the STANDBY interrupt routine. During the SHORT interrupt routine 181 (SHRTINTR) the outputs are not controlled, even to the extent of resetting them. The outputs remain in their last state during execution of the SHRTINTR routine. Block 182 represents a BOOLEAN I/O (ITPINTR) routine 182. Block 183 represents a STATE TRANSITION PROGRAM INTERRUPT (STPINTR) routine 183. There are also an ERROR INTERRUPT (ERRINTR) routine 184 and a FREEZE interrupt routine (not shown) that is set up in response to a HALT instruction.

To switch from one interrupt routine to another, the program processor 29 puts selected data in an interrupt vector address register comprised of an INTVEC+2 location 185 and an INTVEC location 186 in a reserved area of the DMA RAM that is addressed at addresses 00(hex) - 7F(hex). In this example, zero is loaded into the INTVEC+2 location 185, and it is the address in the INTVEC location 186 that will determine which interrupt routine is executed.

During decoding of the INIT instruction, the program processor 29 changes the data in the interrupt vector register to point to the SHRINTR interrupt routine 181. This will stop the execution of either a Boolean or State Transition user program. Near the end of the decoding of the INIT instruction the vector is switched to execute the STANDBY interrupt routine 180 with the outputs held in a reset state until the other instructions in a new user program can be decoded.

In executing the INIT decoding routine 170, the program processor 29 also performs several initialization tasks in preparation for decoding other instructions in the user program. A program function byte (FUNCT) is set up so that the next instruction to be decoded can be either a Boolean instruction or State Transition instruction. When the next instruction is decoded, this function byte will be set to either the Boolean mode or the State mode so that all succeeding instructions in the program file will have to be of the same type or else an error will be signalled. A table of output flags is set up to assure that each output is used only once for each function. For example, an output cannot be programmed twice as an up counter (CTU). The tables for translating the other instructions in the user program are initialized and pointers and tables are initialized for handling data related to timers and counters such as accumulated values. The input filter circuits are also initialized.

It shall be assumed for the following discussion that an INIT instruction has been decoded, and in a following cycle through the DECODE routine, the OTE instruction (referred to as COMBO in Appendix C) is detected. This will cause the program processor 29 to jump to the COMBO decoding routine 171 represented in FIG. 27. In executing this routine, the program processor 29 first checks for programming errors, by checking the FUNCT byte and the table of output flags set up by the decoding of the INIT instruction. Assuming that no errors are detected, the routine will set up data in the SET and CLEAR tables as explained in Section C of this description.

Other decoding routines 171-174 will be called by the DECODE routine to decode Boolean instructions OTL, OTU, CTU, CTD, CTR, and the TMR-TEC instruction. Where the user program file contains State Transition instructions the DECODE routine will set up jumps to STOOUT and STT routines 176 and 177 seen in FIG. 22 and listed in Appendix C.

Assuming the user program has been programmed correctly, the last instruction will be an EXECUIE instruction. When this instruction is encountered during the DECODE routine, the program processor 29 will jump to an EXECUTE decoding routine 177 represented in FIG. 22 and listed in Appendix C.

When decoding a Boolean program, the EXECUTE 177 routine will call and execute a SET EDGE routine (not shown in FIG. 22) to protect against a special condition where a quick timeout could occur when executing the EXECUTE instruction after being a HALT state for a considerable time. After executing the SET EDGE routine, the interrupt vector is switched to point to the BOOLEAN I/O ROUTINE 182 for the next interrupt.

When the EXECUTE instruction is decoded after decoding a State Transition program, a SETPSOUT subroutine (not shown in FIG. 22) is called to set the outputs in the initial output state. The interrupt vector is then switched to point to the STATE PROGRAM I/O ROUTINE 183 for the next interrupt.

Referring to FIGS. 19 and 23, when the interrupt vector is pointing to the location of BOOLEAN I/O ROUTINE 182, the MAIN routine, including the DECODE portion 137, is exited to perform on-line real-time control of the outputs in response to the state of the inputs. In the BOOLEAN I/O ROUTINE 182, instructions are executed to get the input data from INPUTS 0–7. Based on the input combination, a pointer is set up to the TRIGGER, RESET, CLEAR and SET tables in FIG. 8. The data in these table is fetched and placed into working registers in the program processor 29. Some logical operations are then performed to detect changes in rung logic from a logic low or false to a logic high or true (rising edges) which are necessary to start any timers through the setting of outputs from the TRIGGER table. This result is then logically AND'ed with the complement of output data from the RESET table so that any resets will override the triggered outputs. This result is then logically OR'ed with the data from the SET table and logically AND'ed with the data from the CLEAR table to set and clear outputs controlled by OTE, OTL and OTU instructions.

The BOOLEAN I/O ROUTINE 182 then calls a timer/counter routine (TIMCTR0-TIMCTR3) corresponding to each output to update timer and counter accumulated values and to determine if any timers have timed out or any counters have reached an accumulated value equal to or greater than their preset value. In this event the output bit for that output will be set, and upon returning to the BOOLEAN I/O ROUTINE 182 the data will be OR'ed with the previous results to form composite output data. The output status data is then transmitted to the I/O board 25 where it will be converted to output signals to energize and deenergize the output devices. The program processor 29 will then reset the interrupt status flip-flop 78 in FIG. 14 and return to execution of the MAIN routine.

Referring to FIGS. 19 and 23, when the interrupt vector is pointing to the location of STATE TRANSITION PROGRAM INTERRUPT ROUTINE 183, and an interrupt occurs, the MAIN routine, including the DECODE portion 137, is exited to perform on-line real-time control of the output devices in response to the state of the input devices according to a state transition program. After entering this routine 183, the present state is fetched and used as an index into the TABLE OF POINTERS in FIG. 12. The pointer will in turn point to one of the PRESENT STATE TABLES for STATES 1–3. Then the input data is read from the inputs and used as an index into the PRESENT STATE TABLE to obtain the NEXT STATE data. The NEXT STATE data is then used as an index into the TABLE OF OUTPUT STATES to obtain the output status data. The output status data is then transmitted to the I/O board 25 where it will be converted to output signals to energize and deenergize the output devices. The program processor 29 will then reset the interrupt status flip-flop 78 and return to execution of the MAIN routine.

Referring back to FIG. 19, it should now be apparent that the outputs are controlled in response to the state of the inputs by executing machine-language I/O interrupt routines 182, 183 which utilize the translation tables 139 in FIG. 19 to incorporate the logic of the user program in controlling the outputs. With this approach, all user instructions in the higher-level program can be executed through a common routine of machine-language instructions for a selected microelectronic processing machine.

This concludes the description of this section and of the detailed description herein. It will be appreciated by those skilled in the art that many of the details herein have been given by way of example and that various modifications and additions might be made without exceeding the scope of the invention. Therefore, to apprise those skilled in the art and the general public of the scope of the invention, reference is made to the claims which are included herein and which follow Appendix A.

APPENDIX A

| Item | Reference Nr. | Description |
|---|---|---|
| Microcomputer | 27 | Model 8031 Microcomputer manufactured by Intel Corporation |
| Backplane logic circuit | 51 | One 74ALS27 triple 3-input NOR gates, one 74LS14 hex inverters, two 74ALS08 quad 2-input AND gates, two 74ALS74 dual D-type flip-flops, one 74ALS32 quad two-input OR gates, one 74ALS00 quad two-input NAND gates and one 75451 two-input power NAND gate, all manufactured by Texas Instruments, Inc. |
| Two-way latch | 52 | One 74ALS651 octal bus |

APPENDIX A

| Item | Reference Nr. | Description |
|---|---|---|
| Decoding circuit | 53 | transceivers and registers manufactured by Texas Instruments, Inc. One 74ALS541 octal buffers, one 74LS139 dual 2-to-4 line decoders, and gates not used in 74ALS08 quad 2-input AND gates, 74ALS32 quad two-input OR gates, and 74ALS00 quad two-input NAND gates in item 51 above, all manufactured by Texas Instruments, Inc. |
| PROM | 54 | One 2732 4k × 8-bit erasable, programmable read-only memory manufactured by Intel Corporation. |
| DMA Control F-F Interrupt F-F | 55, 78 | One 74ALS74 dual D-type flip-flops manufactured by Texas Instruments, Inc. |
| Two-way buffers | 56, 63, 79 | Three 74HCT245 buffers manufactured by Motorola Semiconductor |
| RAM | 57 | One 6116 2k × 8-bit random access memory manufactured by Hitachi |
| Address latches | 59, 64 | Two 74ALS373 latches manufactured by Texas Instruments, Inc. |
| Clock circuit | 65 | 82C84A clock generator circuit manufactured by Intel Corporation. |
| Microprocessor | 29 | 8088 Microprocessor manufactured by Intel Corporation |
| Buffers | 76, 76a | 74LS367 hex bus drivers and one 74ALS octal buffers manufactured by Texas Instruments, Inc. |
| Counter | 66 | One 74LS290 decade counter manufactured by Texas Instruments, Inc. |
| Timer circuit | 67 | Two 8254 triple programmable counter circuits manufactured by Intel Corporation. |
| PROM | 70 | One 27128 16k × 8-bit erasable, programmable read-only memory manufactured by Intel Corporation. |
| DMA RAM | 71 | One 6164 8k × 8-bit random access memory manufactured by Hitachi |
| Buffers | 73 | Two 74ALS541 octal buffers manufactured by Texas Instruments, Inc. |
| Decoding | 77 | One 74ALS38 3-to-8 line decoder and one 74ALS08 quad two-input NAND gates manufactured by Texas Instruments, Inc. |
| Output Port | 78 | One 74ALS273 octal latch manufactured by Texas Instruments, Inc. |
| Latches | 81, 93, 95 | Three 74HC273 octal latches manufactured by Texas Instruments, Inc. |
| NAND gates | 82 | One 74LS37 quad two-input NAND gate buffers manufactured by Texas Instruments, Inc. |
| OR gates | 83 | One 75453 power OR gate drivers manufactured by Texas Instruments, Inc. |
| Power FET | 90 | IRF-Z30 MOSFET manufactured by International Rectifier |
| Line drivers | 96 | One 74HC541 octal line drivers manufactured by Texas Instruments, Inc. |
| Opto coupler | 98 | HCPL 2200 opto couplers manufactured by Hewlett-Packard |
| Driver | 100 | Two 74HC14 hex inverters manufactured by Texas Instruments, Inc. |
| AND gate | 102 | 74HC32 quad 2-input OR gates manufactured by Texas Instruments, Inc. |
| Counter | 103 | 74HC390 dual decade counters manufactured by Texas Instruments, Inc. |
| Ex-OR gate | 104 | 74HC86 quad two-input ex-OR gates manufactured by Texas Instruments, Inc. |
| Flip-flop | FF-1 | 74HC74 D-type flip-flops manufactured by Texas Instruments, Inc. |

We claim:

1. In a programmable controller, a method of operating an I/O module for controlling machine interface outputs which, during operation, are connected to I/O devices on controlled equipment, the machine interface outputs being controlled in response to signals received through a plurality of machine interface inputs which, during operation, are connected to I/O devices on controlled equipment, the method comprising:

executing a first group of instructions within the I/O module to control the logic state of a machine interface output on the I/O module, said logic state being controlled in response to logic states sensed for the signals from machine interface inputs on the I/O module;

receiving a second group of instructions within a memory in the I/O module, said second group of instructions being received from a processor-based program node, and said second group of instructions including an output instruction for controlling the logic state of the machine interface output in response to logic states sensed for the signals from the machine interface inputs; and translating said output instruction in said second group of instructions within the I/O module into a form for execution with said first group of instructions within the I/O module for controlling the logic state of the machine interface output on the I/O module in response to logic states sensed for the signals from the machine interface inputs on the I/O module.

2. The method of claim 1, wherein
the form into which the output instruction is translated is a data structure that establishes a relationship between the logic state of the machine interface output on the I/O module and the logic states sensed for signals received through the machine interface inputs, and wherein the first group of instructions is executed within the I/O module to control the logic state of the machine interface output on the I/O module in response to the relationship in the data structure between the logic state of the machine interface output and the logic states for the machine interface inputs.

3. The method of claim 1, wherein said output instruction includes an operation code designating the control operation to be carried out, and an operand defining a logic state for one or more machine interface inputs that will cause the control operation to be carried out.

4. The method of claim 1, further comprising:
storing said second group of instructions in the processor-based program node; and
downloading said second group of instructions from the processor-based program node to the I/O module through a communication link.

5. The method of claim 1, wherein said output instruction is an equivalent of ladder diagram program instructions of the type used in programmable controllers.

6. The method of claim 5, wherein said output instruction is a hex-code equivalent of ladder diagram program instructions of the type used in programmable controllers.

7. The method of claim 1, wherein said second group of instructions includes equivalents of state transition instructions that define a transition of the machine interface outputs to a next set of logic states in response to a respective set of logic states for the inputs and in response to a present set of logic states for the machine interface outputs.

8. The method of claim 7, wherein said second group of instructions includes hex-code equivalents of said state transition instructions.

9. In a programmable controller, a method of operating an I/O module for controlling machine interface outputs which, during operation, are connected to I/O devices on controlled equipment, wherein the machine interface outputs are controlled in response to signals received from a plurality of machine interface inputs which, during operation, are connected to I/O devices on controlled equipment, the method comprising:
receiving a file of higher-level instructions within a I/O module, said file of higher-level instructions being received from a processor-based program node, and said file of higher-level instructions including an output instruction for executing an output function and for controlling a machine interface output according to the output function;
translating said file of higher-level instructions to a data structure which, according to the output function, relates a logic state for the machine interface output to logic states sensed for signals received through the plurality of machine interface inputs; and
after translating said file of higher-level instructions, executing an I/O control routine of lower-level instructions for controlling the logic state of the machine interface output in response to logic state sensed from signals from the inputs and according to the relationship established in said data structure during the translating step.

10. The method of claim 9, wherein said file of higher-level instructions is translated into a plurality of tables for relating the logic states of the machine interface outputs on the I/O module to each respective combination of logic states for the machine interface inputs, and wherein said plurality of tables represents a combination of output functions for a plurality of different types of output instructions.

11. The method of claim 9, further comprising holding the machine interface outputs in a preselected state during the translation of said file of higher-level instructions.

12. The method of claim 9, wherein said file of higher-level instructions includes equivalents of state transition instructions that define a transition of the machine interface outputs to a next set of logic states in response to a respective set of logic states for the machine interface inputs and in response to a present set of logic states for the machine interface outputs.

13. The method of claim 12, wherein said file of higher-level instructions includes hex-code equivalents of said state transition instructions.

14. The method of claim 9, wherein said output instruction is an equivalent of ladder diagram instructions of the type used in programmable controllers.

15. The method of claim 14, wherein said output instruction is a hex-code equivalent of ladder diagram instructions of the type used in programmable controllers.

16. The method of claim 14, wherein said output instruction includes an operation code designating the control operation to be carried out, and an operand defining a logic state for one or more machine interface inputs that will cause the control operation to be carried out.

17. The method of claim 9, further comprising:
storing a file of higher-level instructions in the processor-based program node; and
downloading said file of higher-level instructions from the processor-based program node to a processor-based I/O module through a communication link.

18. The method of claim 17,
wherein the processor-based program node is a programmable controller-processor; and
wherein the programmable controller processor downloads the file of higher-level instructions during an I/O scan sequence in which it communicates with other I/O modules which, during operation, are connected to I/O devices on the controlled equipment.

19. The method of claim 17, further comprising the step of communicating a status file to the processor based-program node, wherein said status file includes data representing the logic state of the controlled machine interface output and the logic states sensed for the machine interface inputs during execution of the I/O control routine.

20. An I/O module with machine interface inputs and machine interface outputs for connection to I/O devices on controlled equipment and with means for connection to a controller processor through a communication link, the I/O module comprising:
means on the I/O module for receiving a program downloaded from the controller processor, the program including output instructions for determining logic states of the machine interface outputs in response to logic states of the machine interface inputs on the I/O module;
storage means on the I/O module for storing the program received from the controller processor;

means on the I/O module coupling said means for receiving to said storage means for communicating said program to said storage means;

means on the I/O module coupled to the storage means for executing the output instructions in the program to control the logic states of the machine interface outputs on the I/O module in response to the logic states of the machine interface inputs on the I/O module to complete a control loop through the machine interface inputs to the machine interface outputs of the I/O module.

21. The I/O module of claim 20, wherein the output instructions each include an operation code designating the control operation to be carried out, and an operand defining a logic state for one or more machine interface inputs that will cause the control operation to be carried out.

22. The I/O module of claim 20, wherein said storage means stores a previous program which was installed for execution prior to downloading said program;

wherein said program downloaded from the controller processor includes an initialization instruction; and further comprising means coupled to said storage means and responsive to the initialization instruction to stop the execution of the previous program in said storage means and to hold the machine interface outputs in a preselected state while said downloaded program is being translated.

23. The I/O module of claim 20, wherein said program is communicated to the storage means as a program file.

24. The I/O module of claim 20, wherein the output instructions in the program are equivalents of ladder diagram program instructions of the type used in programmable controllers.

25. The I/O module of claim 24, wherein the output instructions in the program are hex-code equivalents of ladder diagram program instructions of the type used in programmable controllers.

26. The I/O module of claim 20, wherein said program includes instructions which are equivalents of state transition instructions that define a transition of the machine interface outputs to a next set of logic states in response to a respective set of logic states for the machine interface inputs and in response to a present set of logic states for the machine interface outputs.

27. The I/O module of claim 26, wherein said program includes instructions which are hex-code equivalents of said state transition instructions.

28. The I/O module of claim 20, further comprising means for translating the output instructions in the program prior to execution to form a data file structure that relates the logic states of the machine interface outputs to logic states of the machine interface inputs on the I/O module.

29. The I/O module of claim 28, wherein the means for translating forms the data file structure with a plurality of tables in which the addresses within each table correspond to various combinations of logic states of the plurality of machine interface inputs and in which the data at each address corresponds to a set of logic states for the machine interface outputs.

30. The I/O module of claim 28, wherein said means for translating forms tables that relate the logic states of the machine interface outputs to logic states of the inputs of the I/O module for machine interface output instructions in the program having a plurality of output functions; and wherein said means for executing the output instructions forms addresses of locations within the tables in response to signals from the machine interface inputs of the I/O module; and wherein said locations contains output data that is used by said means for executing to generate signals to the machine interface outputs of the I/O module.

* * * * *

UNITED STATES PATENT AND TRADEMARK OFFICE
CERTIFICATE OF CORRECTION

PATENT NO. : 4,972,365

DATED : November 20, 1990

INVENTOR(S) : John F. Dodds, et al.

It is certified that error appears in the above-identified patent and that said Letters Patent is hereby corrected as shown below:

Col. 1, line 42    "cf" should be --of--.

Col. 1, line 66    Insert heading "Summary of the Invention" before "The".

Col. 6, line 46    "I/C" should be --I/O--.

Col. 6, line 62    "(M(B)" should be --(MCB)--.

Col. 16, line 52    "0!-03" should be --01-03--.

Col. 20, line 13    "Processor 2" should be --processor 29--.

Col. 23, line 14    "cf" should be --of--.

Col. 35, line 62    "state" should be --states--.

Signed and Sealed this

Twentieth Day of October, 1992

*Attest:*

DOUGLAS B. COMER

*Attesting Officer*      *Acting Commissioner of Patents and Trademarks*